United States Patent [19]

Schmidt et al.

[11] Patent Number: 5,392,328
[45] Date of Patent: Feb. 21, 1995

[54] SYSTEM AND METHOD FOR AUTOMATICALLY DETECTING ROOT CAUSES OF SWITCHING CONNECTION FAILURES IN A TELEPHONE NETWORK

[75] Inventors: Barnet M. Schmidt, Oradell; Lawrence P. Schopperth, Kinnelon, both of N.J.

[73] Assignee: Bell Communications Research, Inc., Livingston, N.J.

[21] Appl. No.: 13,282

[22] Filed: Feb. 4, 1993

[51] Int. Cl.6 .......................... H04M 1/24; H04M 3/22
[52] U.S. Cl. ........................................ 379/10; 379/15; 379/16; 379/17; 379/22; 379/23
[58] Field of Search ................ 379/5, 9, 10, 15, 16, 379/17, 22, 23, 32

[56] References Cited

U.S. PATENT DOCUMENTS

| | | | |
|---|---|---|---|
| 3,299,220 | 1/1967 | Wenmore | 379/10 |
| 3,626,383 | 12/1971 | Oswald | 379/10 |
| 3,777,080 | 12/1973 | Padgett | 379/15 |
| 3,922,499 | 11/1975 | Athas et al. | 379/17 |
| 3,941,949 | 3/1976 | Miller | 379/17 |
| 4,345,324 | 8/1982 | Smitt | 379/15 |
| 4,516,076 | 5/1985 | Pillari | 379/10 |
| 4,692,939 | 9/1987 | Parsons | 379/17 |
| 4,741,017 | 4/1988 | Parsons et al. | 379/32 |
| 4,860,334 | 8/1989 | Kohl et al. | 379/16 |

Primary Examiner—Stephen Chin
Assistant Examiner—Vijay Shankar
Attorney, Agent, or Firm—Leonard Charles Suchyta; Joseph Giordano

[57] ABSTRACT

An operating system is provided for an analog switching machine having switch fabric formed by multiple line and trunk link networks having interconnected switch stages with each switch stage having multiple grid connections and makes post-connection continuity checks. Error messages are generated for connection faults and sent to a monitor and analyzer computer. The error messages are automatically processed to identify the root causes of connection faults, i.e. to detect open and stuck crosspoints, faulty interstage links and faulty pulse path devices. The analyzer computer further generates command signals that provide for removal of faulty crosspoints and other failed elements from analog switching machine operation.

32 Claims, 7 Drawing Sheets

SYSTEM AND METHOD FOR AUTOMATICALLY DETECTING ROOT CAUSES OF SWITCHING CONNECTION FAILURES IN A TELEPHONE NETWORK

BACKGROUND OF THE INVENTION

The present invention relates to telephone switching networks and more particularly to fault locating systems employed therein.

In telephone switching networks, analog electronic switching machines employ switch fabrics which are multiple-input/multiple- output matrices that permit the routing of messages from any calling subscriber to any receiving subscriber. The switch fabrics provide a connection for any of various types of calls including line-trunk, line-line, and trunk-trunk call types from the call originator on the line side of an analog switch to a destination line side of another or the same analog switch.

The switch fabric in each analog switching machine is physically constructed of arrays of grids with each grid containing an electrical switch crosspoint at each intersection of input and output levels. Stored-program network controllers are employed with the analog switching machines to set up a requested connection by closing appropriate crosspoint switches, in all of the corresponding grids, in all of the involved switching machines, to provide the end-to-end path from originator to terminator.

The crosspoint switch actions are implemented by relays that can fail. Additionally, the network controllers that order the proper relays to close and open and the pulse devices that implement the network orders can fail as well. Links between switch grids can also fail. To provide acceptable network availability, it is necessary that connection failures not only be detected but that the root causes of the failures be identified and serviced.

Analog electronic switching machines are normally operated to transmit an error message every time the machine attempts to set up a connection, but the desired connection fails a post-setup continuity test executed by the machine.

In the prior art, failed path messages from an analog switch machine have been listed for interpretation by an operator. The operator, on the basis of system and machine knowledge, manually processed and analyzed the raw error messages in an attempt to determine the root-cause of trouble and thereby to identify fault locations. Typically, collected error message data has been formatted as switch pictures for analysis analyzed from time to time by an operator in an effort to identify failed crosspoints or other connection failures. While crosspoint and other failures have often been located and serviced with use of this maintenance procedure, the methodology has been labor intensive and network availability has not been as high as desirable. Further, customer service has been adversely affected by the time required to isolate and repair connection faults.

Moreover, it has been difficult with known prior art procedures to identify the root causes of connection failures, and certain kinds of connection failures have often appeared to be other kinds of connection failures with the result that unnecessary service costs have been incurred by the replacement of parts in good working order.

Actual failures have been masked by other failures in a number of different ways including the following:
1. a failed pulse device may appear to be a failed crosspoint;
2. a grid link failure may appear to be multiple crosspoint failures;
3. a network controller failure may appear to be failed crosspoints and/or failed pulse devices.
4. stored program execution errors may appear to be any of the above.

SUMMARY OF THE INVENTION

Accordingly, to provide enhanced network availability with reduced restoral costs, the present invention is directed to a system that automatically and specifically detects and, if desired, removes connection faults. The system preferably employs a pattern recognition system that correlates individual connection failure instances from analog switching machines to identify specific points of failure.

A system is provided for operating an analog switching machine that has a first plurality of paired line link and trunk link networks. Each of the paired networks has a second plurality of sequentially interlinked switch stages. Each of the switch stages has multiple grids with input levels and output levels interconnectable at crosspoints by respective relay switches and interconnectable between switch stages by links to form call connection paths. Pulse order objects are provided in a third plurality of pulse paths for energizing the crosspoint relays.

The system comprises a controller for generating network call connection orders and operating the pulse devices to implement the network orders. The controller generates a post-connection continuity check and generates an error message if the continuity check indicates that the ordered connection has failed. Means are provided for processing the error messages generated over time to identify the root cause of connection failures. The processing means has means for identifying failed crosspoints from error messages that represent failed connections, and the processing means further has means for identifying failed pulse path objects from error messages that represent failed pulse paths.

BRIEF DESCRIPTION OF THE DRAWINGS

The accompanying drawings, which are incorporated in and constitute a part of this specification, illustrate a preferred embodiment of the invention and together with the description provide an explanation of the objects, advantages and principles of the invention. In the drawings.

DESCRIPTION OF THE INVENTION

General

The switch fabrics of analog telephone electronic switching machines are multiple-input/multiple-output matrices that permit the routing of a message from any calling subscriber to any receiving subscriber within a telephone network. The switch fabric provides a connection for various types of calls including line-trunk, line-line, and trunk-trunk from the call originator on the line side of the switch to a message trunk and ultimately a destination switch.

The switch fabrics are physically constructed of arrays of grids, with each grid containing an electrical switch crosspoint at each intersection of input and output levels. A stored-program network controller sets up a requested connection by closing the appropriate crosspoint switches, in all of the corresponding grids, in all of the involved switching machines, to provide the end-to-end path from the originator to the terminator.

The crosspoint switch actions are implemented by relays that can fail. Additionally, the network controllers that order the proper relays to close and open can fail as well. To provide high availability for the network and cost-effective network restoral in the event of connection failures, it is desirable that the root cause of each connection failure be specifically identified, that is, the specific grid, grid link, relay, pulse device, selector, network controller, or any other element that may fail needs to be detected and specified so that the network operates with high availability and with maintenance economy.

A line-line failure is a failed connection from subscriber to subscriber within a given switch. A line-trunk failure is a failed connection from a subscriber to a trunk. A trunk-trunk failure is a failed connection from an incoming trunk to an outgoing trunk.

Moreover, certain crosspoint switch failures have often masked the fact that another device is actually the root-cause of a connection fault. Extensive operator effort has been required to perceive and analyze error data resulting from failures of this type, and, even then, a correct resolution of the trouble has often not been able to be determined.

Figure 1:
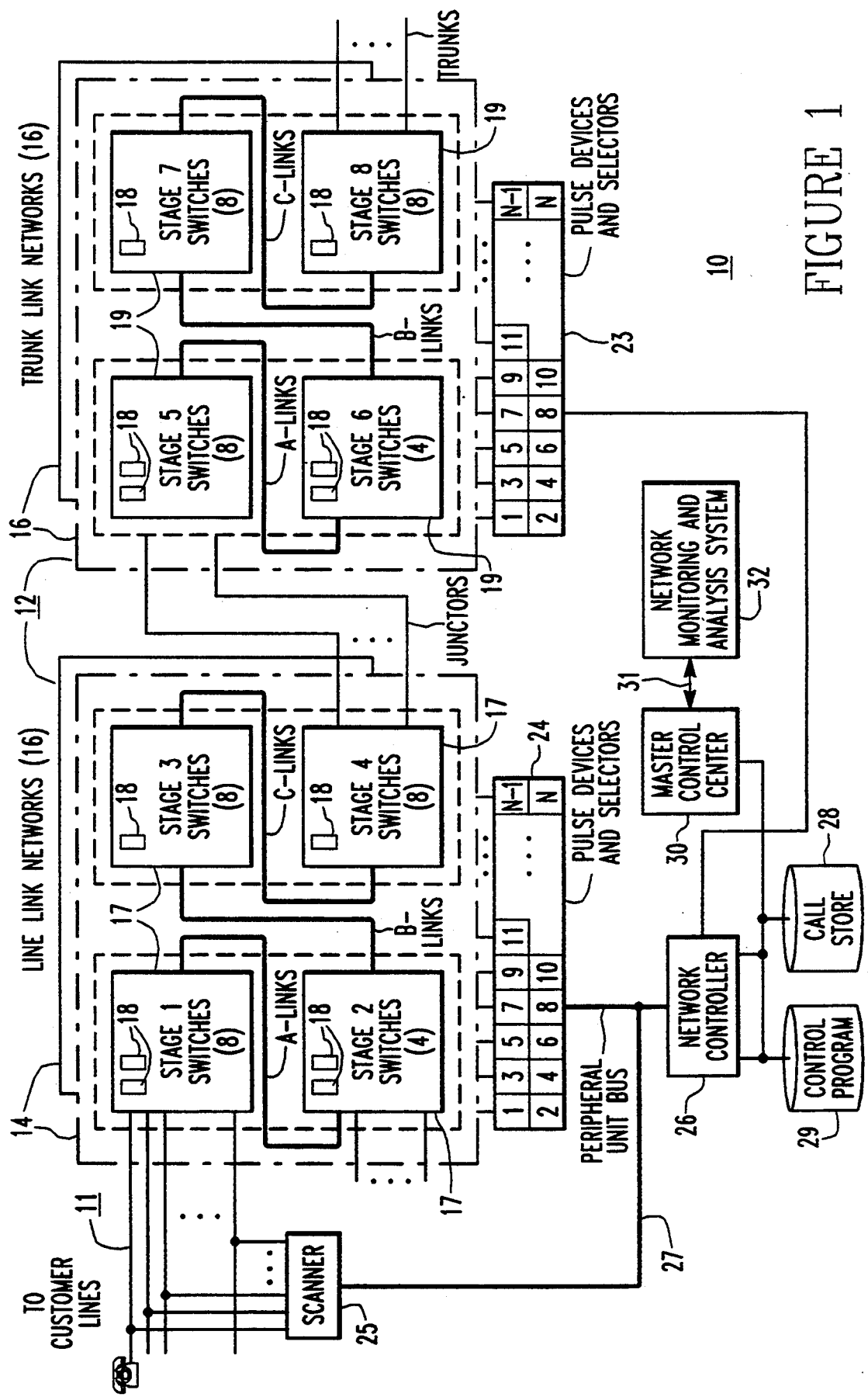
FIG. 1 is a schematic diagram that shows a portion of a telephone switching network including an analog switching machine operated by a network controller and provided with network monitoring and analysis in accordance with the present invention.

A portion of a telephone switching network 10, arranged in accordance with the invention as shown in FIG. 1, includes an analog switching machine 12 which is one of a plurality of hierarchically interconnected analog switching machines servicing a large number of customer service lines, including lines 11, throughout a wide area.

Analog Telephone switching Machine

An analog telephone switching machine 12 includes a plurality of line link networks 14 and a plurality of trunk link networks 16 and may be located in a local switching office where it is correlated to a local exchange number and directly connected to local customer service lines. A local switching office may contain up to sixteen or more paired line link and trunk link networks 14 and 16. In the drawings, the numbers in parentheses represent the number of the corresponding structural units provided in the machine 12.

An analog switching machine (not shown) may be correlated by an area code and located regionally to provide connections to and from exchanges within the area. Connections between line link and trunk link networks in each analog machine are called junctors. Connections between analog machines are called trunks.

Figure 7:
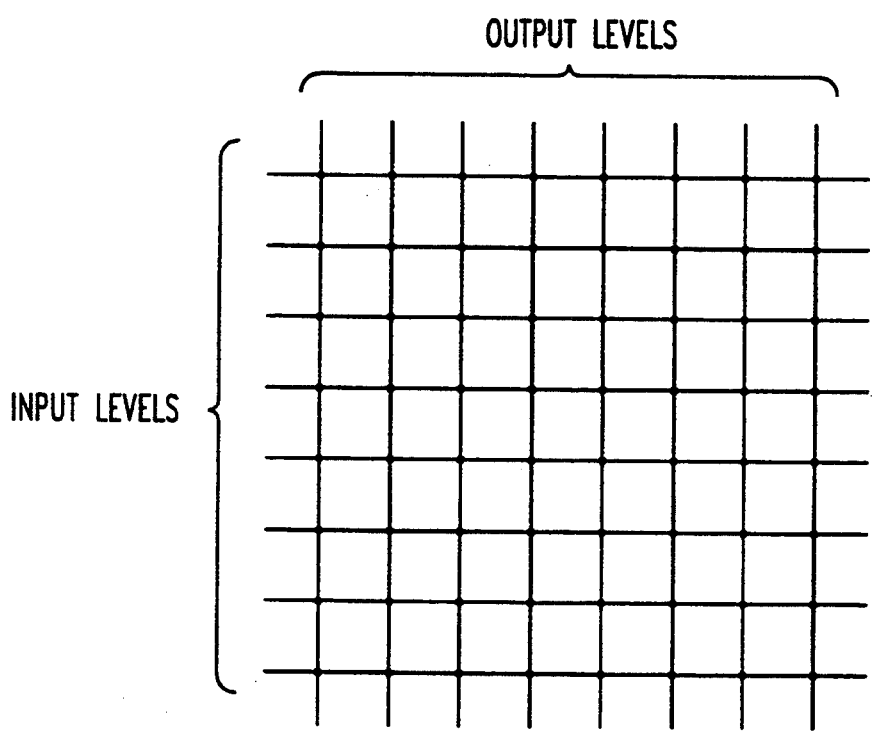
FIG. 7 is a schematic diagram of a switch grid employed in the analog switching machine of FIG. 1.

Each link network forms a portion of the switch fabric and includes, in this embodiment, four switch stages 17 designated as stages 1, 2, 3, and 4. In turn, each switch stage 17 includes multiple grid switches 18 (sixty-four in this embodiment), each of which is an interconnection matrix. As shown in FIG. 7, each grid 18 includes multiple input levels and multiple output levels with a crosspoint switch (relay) connected at each intersection between rows and columns.

Similarly, each trunk link network 16 includes four such stages 19 designated as stages 5, 6, 7, and 8. Each switch stage 19 also includes sixty-four grid switches 18. The switch stages 1 and 2 in the line link network 14 and the switch stages 5 and 6 in the trunk link network 16 are often referred to as "concentrator" stages because of the line connection concentration provided by these stages.

An exchange office having sixteen line and trunk link network pairs, with grids 18 having eight input levels and eight output levels, would have a total of 16×8×64×64=524,288 crosspoint switches. Thus, large volumes of data are involved in providing analog switching machine analysis.

Each crosspoint switch is subject to failure, and any particular failed connection may be caused by a failure of one or more crosspoint switches. As subsequently considered more fully herein, the present invention provides improved detection and servicing of connection failures where the root cause of the failure is one or more crosspoint switches.

Within the machine 11, the grid output and input levels are interconnected between switch stages 17 and 19. Thus, each grid output line in each switch stage is connected to a grid input line in the next switch stage. Within each link network 14 or 16, such interconnections are called grid links.

In FIG. 1, the multiple grid links between successive stages are illustrated as respective cable links A, B, and C. The grid links between the switch stage 4 in the line link network 14 and the switch stage 5 in the trunk link network 16 are called junctors. As illustrated, the output links from the switch stage 8 are called trunks.

Any grid or trunk link can possibly fail and thereby cause a failed connection. As subsequently considered more fully herein, link failures are often masked by crosspoint switch failures and have been difficult to identify as a root cause of a failed connection. The present invention helps resolve this difficulty.

With the described switch path architecture, a total of eight crosspoint switches must be designated for closure to establish a connection through the switching machine 12 from a calling line to a destination line. Such connections are established by network orders under network control.

Respective sets 24 and 23 of pulse devices and selectors are provided for energizing the relay coils and operating the crosspoint switches in the respective link networks 14 and 16. The crosspoint switches are provided in the form of relays, and the pulse devices are selectively operated by a network controller 26 to pulse the coils of eight designated relay (crosspoint) switches which, when closed, will complete a connection path through the switch machine 12 for a calling party.

Preferably, each pulse device is connectable through multiple selectors to operate any of multiple crosspoint relays and thereby enable calls to be completed with equipment economy. The number of pulse devices employed is sufficient to support the design capacity of the analog switching machine 12.

The selectors are electronic circuits that enable the pulse devices and connect the enabled pulse device to a relay coil. The pulse devices, in turn, generate a high-voltage electrical pulse with a characteristic shape that will operate the relay coil, thus opening or closing the relay. The selectors are needed to assign the pulse devices to relays since there are fewer pulse devices than crosspoints. The selectors can fail and produce symptoms ("crosspoint failures") similar to those produced by pulse device failures.

Any element disposed in a circuit channel that is implementing a network order, issued by the controller 26 for crosspoint switch closures needed to establish a call connection, may be the root cause of a failure of that connection. Network order failures are typically masked by apparent crosspoint switch failures. Thus, pulse devices and other objects in the order path can be the root cause of connection failures, and, as subsequently described more fully herein, the present invention improves over the prior art by unmasking failed objects in network order paths as root causes of failed connections.

Thus, the software correlates the crosspoint failures with pulse device failures to determine if there are any failed pulse devices. If no root cause pulse device is implicated, the records of which selector(s) were assigned to a given set of pulse devices ("pulse path") are patterned in a manner similar to pulse devices to determine any root-cause selector failures.

The network controller 26 is conventionally structured and operated under control of a program 29 to generate a network order in response to each dialed call. The network order defines a connection path that includes a series of eight switches for each connection through the analog switching machine 12. The eight switches are grid crosspoint switches sequentially located in the successive switch stages 1 through 8 as previously indicated.

A network order is executed by the pulse devices and selectors and the network controller 26 then makes a post-connection continuity check and releases the connected path to the calling line if a valid connection is detected. If a failure is detected, an error message is generated, the calling line is kept on hold until a connection path is established to the requested destination, and the network controller 26 sends out a new network order to try another connection path.

The network controller 26 is also in the network order channel, and, if it has failed, can also be the root cause of a connection path failure. The present invention also improves over the prior art in providing network analysis that detects network controller failures as the root cause of connection failures.

A scanner 25 examines each line for on/off hook by subscribers, and informs the network controller 26 which customer(s) desire service (i.e. which customers are "off-hook").

Each time a new connection path is established, it is stored in a call storage unit 28. Each time a connection path is torn down, it is removed from the storage unit 28.

A master control center 30 includes an operator interface that provides appropriate controls and displays to enable an operator to control the system. Error messages designating connection faults are transmitted through a communication link 31 to a network monitoring and analysis system 32.

Figure 2:
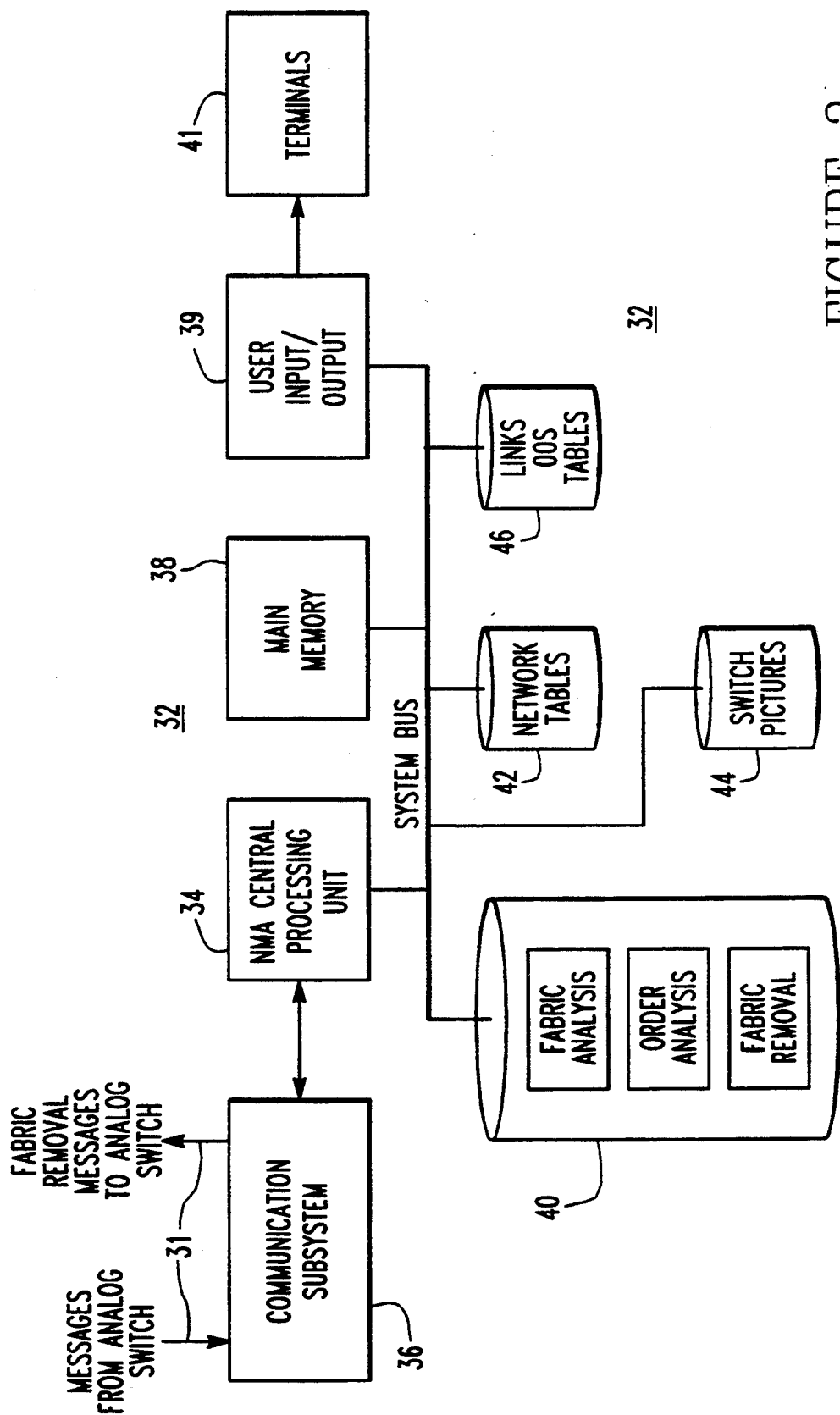
FIG. 2 is a more detailed block diagram of a network monitoring and analysis system that provides fault detection for the network of FIG. 1 in accordance with the invention.

The network monitoring and analysis (NMA) system 32 is shown in greater detail in FIG. 2. An NMA central processing unit (CPU) 34 communicates with the analog switches through a communications subsystem 36 and the associated communication link 31 (FIG. 1). Error messages are received from the analog switching machine 12 and other analog switching machines (not shown) in the network 10. Fabric removal messages are sent to the analog switching machine 12 and other switching machines in the network 10. An operator interface 39 is provided for user inputs and outputs through terminal or other devices 41.

A main memory 38 is provided for the CPU 34. A network analyzer 40 includes stored program components that execute analysis logic in accordance with the invention to detect the root causes of connection failures reported through the error messages.

Network tables 42 are retained in storage to define the physical configuration of each analog switching machine in the network 10. In addition, switch pictures 44 are stored to provide diagrams of connection failures after root cause determinations are made.

Additionally, links out-of-service tables 46 are stored to provide a record of failed connection paths detected through operation of the analyzer 40. The tables 46 enable the system 32 to transmit fabric removal messages to the analog switching machines in the network 10, and specifically to the network controller 26 in the machine 12 so that the controller 26 can exclude failed paths from network orders generated for the machine 12. In this way, the network 10 is operated in accordance with the invention to be self-healing.

Connection Fault Detection and Removal Procedure—General

Figure 3:
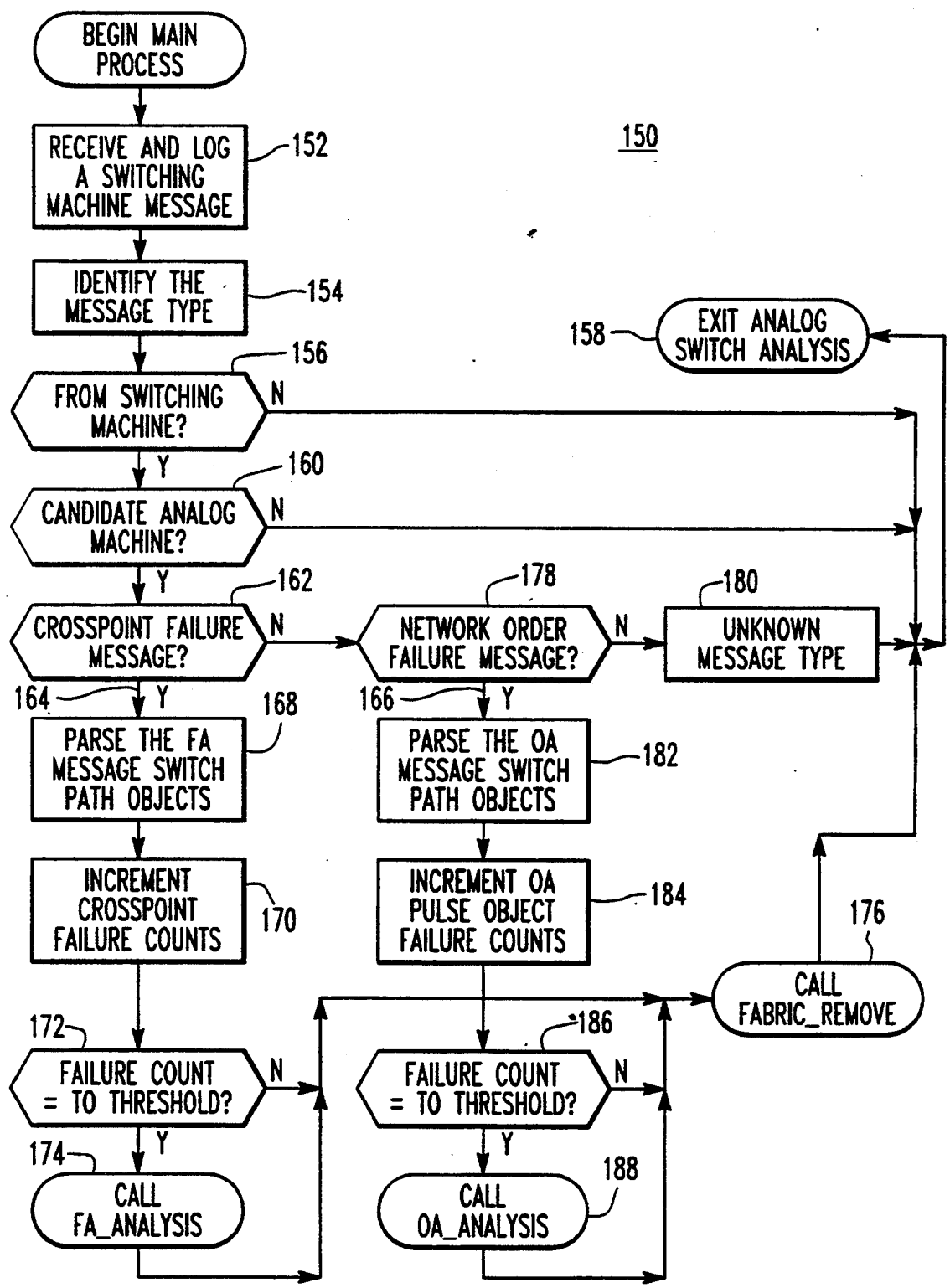
FIG. 3 is a flow chart for a basic procedure employed by the network monitoring and analysis system in detecting connection failures in the network.

In FIG. 3, there is shown a flow chart that represents an overall procedure 150 employed in the system 10 to detect and remove the causes of connection faults. The procedure 150 detects and analyzes specific error messages generated by an analog switching machine 12 when it encounters trouble in setting up or tearing down network connections. The information contained in the error messages is used in a pattern-recognition process to determine the physical location and type of faults.

Once the main procedure 150 has begun, a block 152 receives and records switching machine error messages from the communication subsystem 36. The error messages contain "raw" connection failure data, i.e. a specification of the failed connection path including the eight crosspoint switches in the connection as defined by the respective grid input and output levels.

Next, a block 154 classifies the error messages according to the type of error message and the type of failure. This classification provides a basis for later application of rules in fault analysis.

If a test block 156 indicates that an error message selected for processing is not from an analog switching machine and from another type of network element, the procedure is ended in block 158. Similarly, a test block 160 ends the procedure if the error message is not from a candidate machine.

A "candidate" machine means an analog switching machine for which the message rules have been implemented. The system receives messages from many types of network elements, and only analog switch messages are acted upon in the operation of the invention.

If the blocks 156 and 160 both test yes, another block 162 tests the error message for a crosspoint switch failure. The test block 162 basically determines whether the error message indicates a switch path failure or a network order path failure. The network controller 26 of the analog switching machine 12 structures the error messages to indicate the kind of connection failure.

A switch path failure is processed in a flow path 164, whereas a network order path failure is processed in a flow path 166. If the error message is for a crosspoint switch failure, a block 168 in the path 164 parses the error message to the individual crosspoint switches in the connection path ordered by the network controller 26. In other words, the connection failure is disassembled into the individual crosspoint switches in the failed connection path.

As previously indicated, each grid is a physical assembly of relay crosspoints and the grids interconnected, form the physical switching paths of the analog electronic switching machine fabric. Grids generally have N input levels and M output levels, with a relay located at each intersection of an input and an output level. The number of crosspoints is therefore the product of N and M, and the grid is referred to as an N×M grid.

A relay failure can be either of two distinct types, i.e., an open or a short ("stuck" relay). A permanently open relay causes any connection attempt through the crosspoint containing the open relay to fail, each time such a connection is attempted. A permanently shorted (or closed) relay, by forcing every crosspoint in that particular input and output level to be tied together, causes any connection attempt through any crosspoint in the input or output level (containing the shorted relay) to fail.

Generally, the main procedure 150 isolates fabric faults through an identification of failed connection path patterns.

Thus, as previously noted, the analog electronic switching machine 12 transmits an error message every time the machine attempts to set up a connection, and the desired connection fails the post-setup continuity test made by the machine.

A patterning algorithm operates upon sets of failed connection information collected from the switching machines' messages. Each message identifies the input and output levels involved in the failed connection, but the patterning algorithm correlates multiple occurrences of these data to locate the actual failed crosspoints and their failure types.

The patterning algorithms are applied to error messages after they have been translated from analog machine-specific format. Thus, the patterning algorithms are applicable to any analog switch that can supply the necessary connection failure information in whatever format is specific to that machine. "Candidate" machines have these translation rules installed in the system.

Where a predetermined threshold level has been exceeded, a call is made for fabric analysis in a block 174. In accordance with the invention, patterning is applied to the failed connection to determine automatically the root cause of failure with improved facility and greater economy. Patterning is a process in which recorded failure patterns are logically compared to defined failure patterns that represent different root cause failures.

After patterning by the block 174, as subsequently more fully considered, a call is made in a block 176 for execution of a fabric removal procedure to remove from operation whatever element is identified as a failed element by the block 174. The main procedure 150 is then ended.

Once a fault has been detected and identified, a signal is generated by a removal algorithm and sent to the switching machine to remove the faulted grid or higher-level fabric equipment from service. Thus, the network controller of the switch machine is directed not to set up any more connections through paths involving the faulted grid. The removal algorithm is structured to determine the lowest level of equipment in the switch fabric that must be removed to remove the fault from the network. Accordingly, the invention provides an automated self-healing capability for the switch fabric.

The block also uses the faulty grid identification to search a table containing a list of physical grid locations and manufacturer's model numbers, and display instructions that enable a craft technician to replace the faulty grid, crosspoint, or link within the switching machine.

In the network order path 166, a test block 178 tests whether the error message corresponds to a network order. If not, a block 180 records an unknown message type, and the main procedure 150 is ended.

A network order defines the pulse objects used to make a connection to a crosspoint. Thus, a network order failure serves as a flag in the present invention for the failure analyzer 150 to perform a patterning operation that determines which crosspoint failures are correlated to network order failures. A network order failure indicates that a connection has failed to be produced and it may be the root cause of many individual crosspoint failures. In such cases, the crosspoint failures are only symptoms of the root cause, i.e., one or more failed pulse path objects (i.e. "object" includes pulse selectors and pulse devices).

For a network order error, a block 182 first parses the error message to the elements or objects in the network order path (often referred to as the pulse path). The network order path objects include the network controller, elements of a peripheral unit bus 27 (FIG. 1), the pulse devices, and the selectors.

A block 184 then parses the error message to the pulse objects in the failed network order path, and a test block 186 determines whether a predetermined threshold level of failures has been exceeded for any of the pulse objects. If not, the main procedure 150 is exited.

Otherwise, a call is made in a block 188 for network order analysis. Thus, by disassembling failed network orders, a failed pulse object common to numerous network orders is unmasked as a failed pulse selector or pulse device. Next, the fabric removal procedure 176 is called for removal of the object determined to be the root cause of the failed connection by the block 188. The main procedure 150 is then ended.

Fabric Analysis

Figure 4:
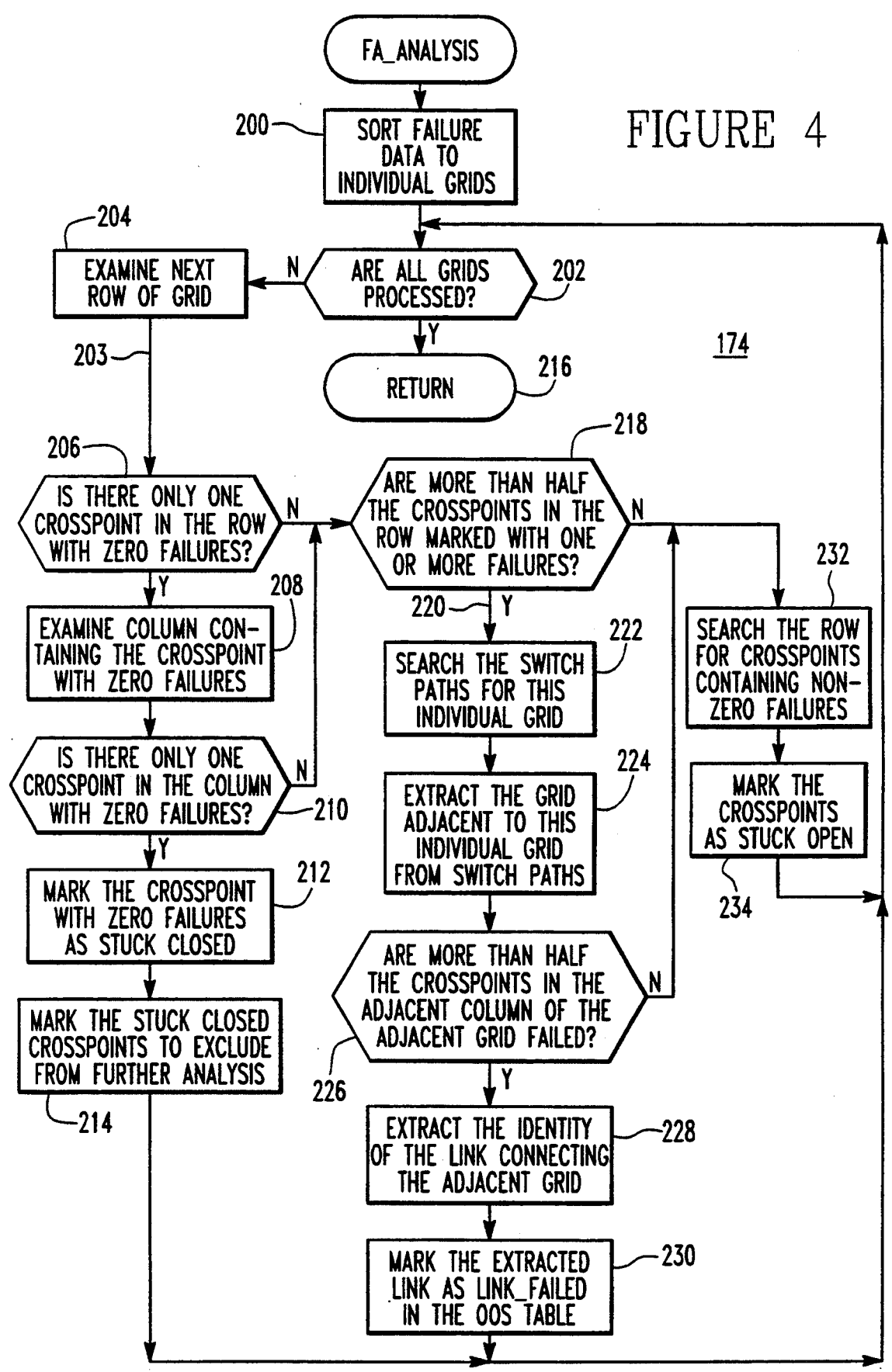
FIG. 4 is a flow chart that provides greater logic detail for a switching fabric failure analysis procedure included in the basic procedure of FIG. 3.

The fabric analysis procedure 174 is shown in greater detail in FIG. 4. After entry, a block 200 sorts failure data to individual grids 18. The sorted data represents a listing of crosspoint failures which corresponds to a switch picture of raw data like that used in prior art manual switch servicing procedures as previously described. In accordance with the present invention, however, the sorted data is processed in a new and different way to provide significantly improved analog switching machine servicing and operation.

A test block 202 determines whether a grid 18 in the switching machine 12 needs to be processed. In a path 203 for grid processing, a first block 204 selects successive rows (input levels) of the grid being processed for examination in successive program passes through the path 203.

Shorted or stuck crosspoints will cause connection attempts through any paths containing every crosspoint in the same input and output level (other than the stuck crosspoint) to fail. An attempt through a path containing the stuck crosspoint will succeed. The pattern for stuck crosspoints is to verify a minimum number of failures on every input level (of each output level) and on every output level (of each input level), and zero failures at the intersection of the input and output levels. The intersection (that is, the crosspoint displaying a zero failure count) identifies the stuck crosspoint.

In a test block 206, the grid row being examined is tested as to whether only one crosspoint switch in the row has zero failures. If so, a block examines the grid column (output level) that contains the crosspoint with zero failures. If test block 210 determines that there is only one crosspoint failure in the column with zero failures, a block 212 marks the crosspoint with zero failures as a STUCK CLOSED failure. A block 214 then excludes the STUCK CLOSED crosspoint from further fabric analysis, and a return is made to the block 202 to process the next row in the grid just processed, or to the first row in the next grid to be processed, or to make a return in a block 216 to the main procedure 150.

If either of the test blocks 206 or 210 test negative, there is no STUCK CLOSED failure, and another test block 218 is entered for additional failure analysis. The block 218 tests each grid row as to whether a majority of the crosspoints in the row are marked with one or more failures. If so, the procedure 174 is directed to a branch 220 for a determination of possible link (A, B, C) or junctor failures.

Links are the switch paths connecting the adjacent grids on the switch fabric. The possibility exists for a link failure to appear as a number of crosspoint failures. The patterning algorithms also tests for link failures.

Link failures are characterized by a majority of failed crosspoints on the same input and/or output level of a grid. This pattern is similar to that for open crosspoints, however, open crosspoints tend to be isolated whereas link failures affect the majority of crosspoints on the input or output level. The patterning algorithm will count the number of failed crosspoints on each level, and, by disassembling the switch path information contained in the switching machine connection failure messages, identify the particular switch grid and level comprising the adjacent stage of switching. The algorithm then searches the messages for crosspoint failures on the identified adjacent switch grid and level. If a majority of failed crosspoints exist on that grid and level as well, the link connecting the first switch and level with the adjacent grid and level is considered to be failed.

A block 222 searches the switch paths for the switch path containing the individual grid 18 being processed. The adjacent grid 18 is identified from the switch path by a block 224 for testing in a block 226.

The block 226 tests the adjacent column of the adjacent grid for a majority of failed crosspoints. If the test is affirmative, a block 228 identifies the link connecting the tested row and the tested column of the adjacent grids, and a block 230 marks the identified link as a failed link in an OUT OF SERVICE table. A return is then made to the block for further processing as previously described.

Open crosspoints cause a connection attempt through any path containing the open crosspoint to fail. Any other connection attempts through paths containing any other (operational) crosspoints in the same input and output level of the grid will succeed. After a minimum number of connection failure messages from the switching machine have been received, the messages are disclosed for common grid and input/output level identifications. Also all of the other crosspoints on the identified input and output levels which are not identified as failed in any of the messages are verified. The identified common crosspoints are then open.

If either block 218 or 226 indicates there is no link failure, and with STUCK CLOSED failures having previously been excluded, the failed connection is logically concluded to be a STUCK OPEN failure. Accordingly, a block 232 searches the grid row being processed for crosspoints having non-zero failures. A block 234 marks the detected crosspoint(s) as STUCK OPEN and a return is made to the block 202 for further processing.

Network Order Analysis

Figure 5:
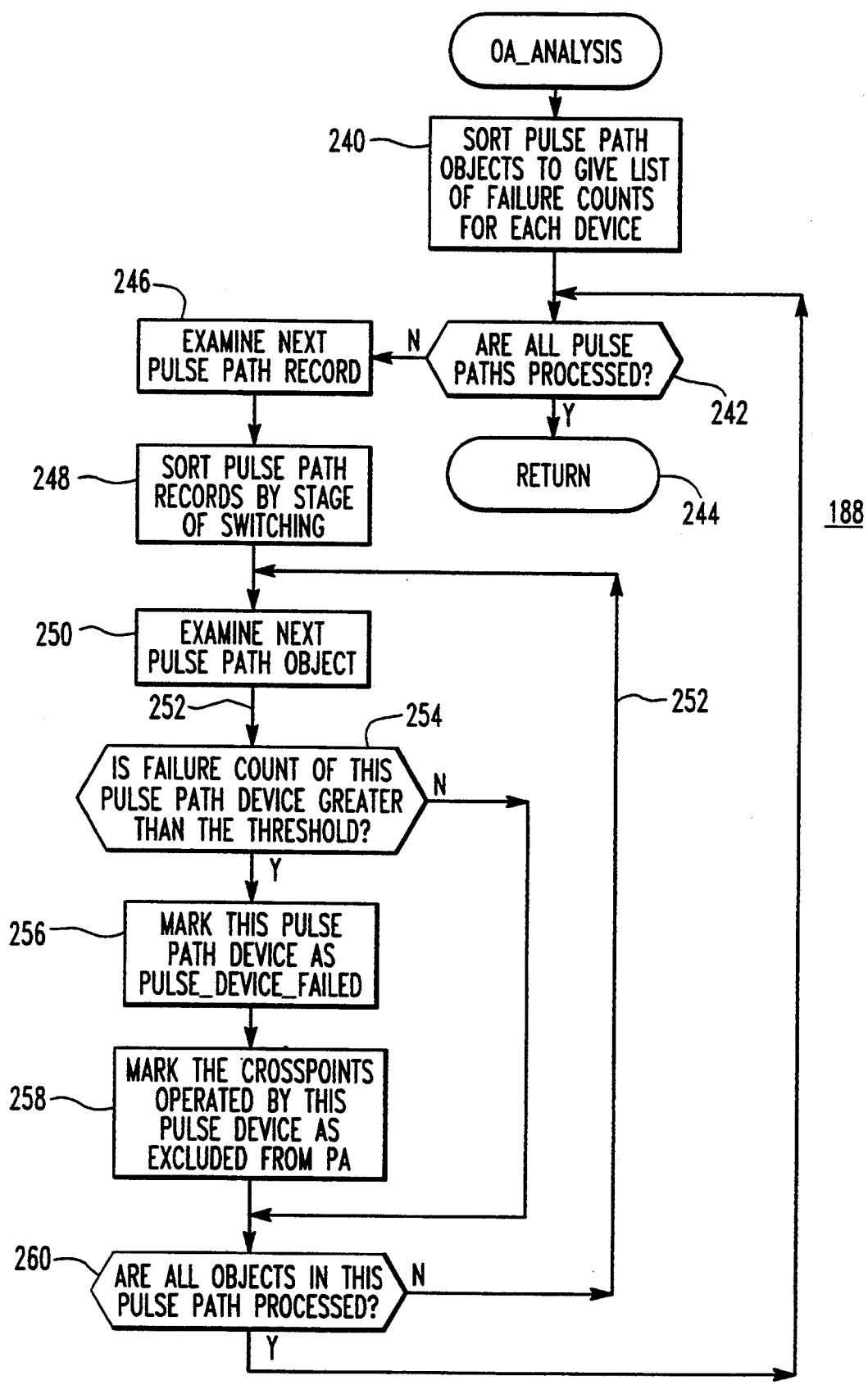
FIG. 5 is a flow chart that provides greater logic detail for a network order failure analysis procedure included in the basic procedure of FIG. 3.

The network order analysis procedure 188 shown in FIG. 5 is called after the network order path 166 has been entered in the main procedure 150. A block 240 first sorts all failable objects (that is, pulse device, selector, bus connector, or controller) in each pulse path to provide a failure count for each pulse path object. Next, a test block 242 determines whether a pulse path needs to be processed. If not, the procedure 188 is ended by block 244.

To process pulse paths, a block 246 first selects the next pulse path record to be processed. A block 248 sorts the pulse path record according to the associated stage of switching. In this manner, an identification is made of a stored set of connection rules specific to the pulse objects and the crosspoints in the associated switch stage. Pulse objects can thus be correlated to crosspoint failures.

Pulse objects in the selected pulse path are sequentially selected for examination by a block 250 in a program subloop 252. A test block 254 checks the failure count to determine whether a preset threshold value has been exceeded. If so, the pulse object being processed is marked as failed in a block 256, and a complex search is then made in a block 258 using stored machine connection rules to mark those crosspoints operated by the failed pulse object for exclusion from fabric analysis. The block 258 searches all of the past pulse path records to determine which crosspoint(s) were ever operated by that pulse device and selector.

A test block 260 determines whether all pulse objects in the current pulse path have been processed. If not, a return is made in the loop 252 to the block 250 to process the next pulse path object. Otherwise, a return is made to the block 242 to process the next pulse path.

Fabric Removal Procedure

The invention provides for self healing of the analog telephone switching machine 12 in the sense that detected failed elements are disconnected and removed from operation until the machine is serviced with replacement parts. The fabric removal procedure 176 shown in FIG. 6 is called after the fabric analyzer 174 or the network order analyzer 188 detects a failed crosspoint or a failed pulse path object.

Figure 6:
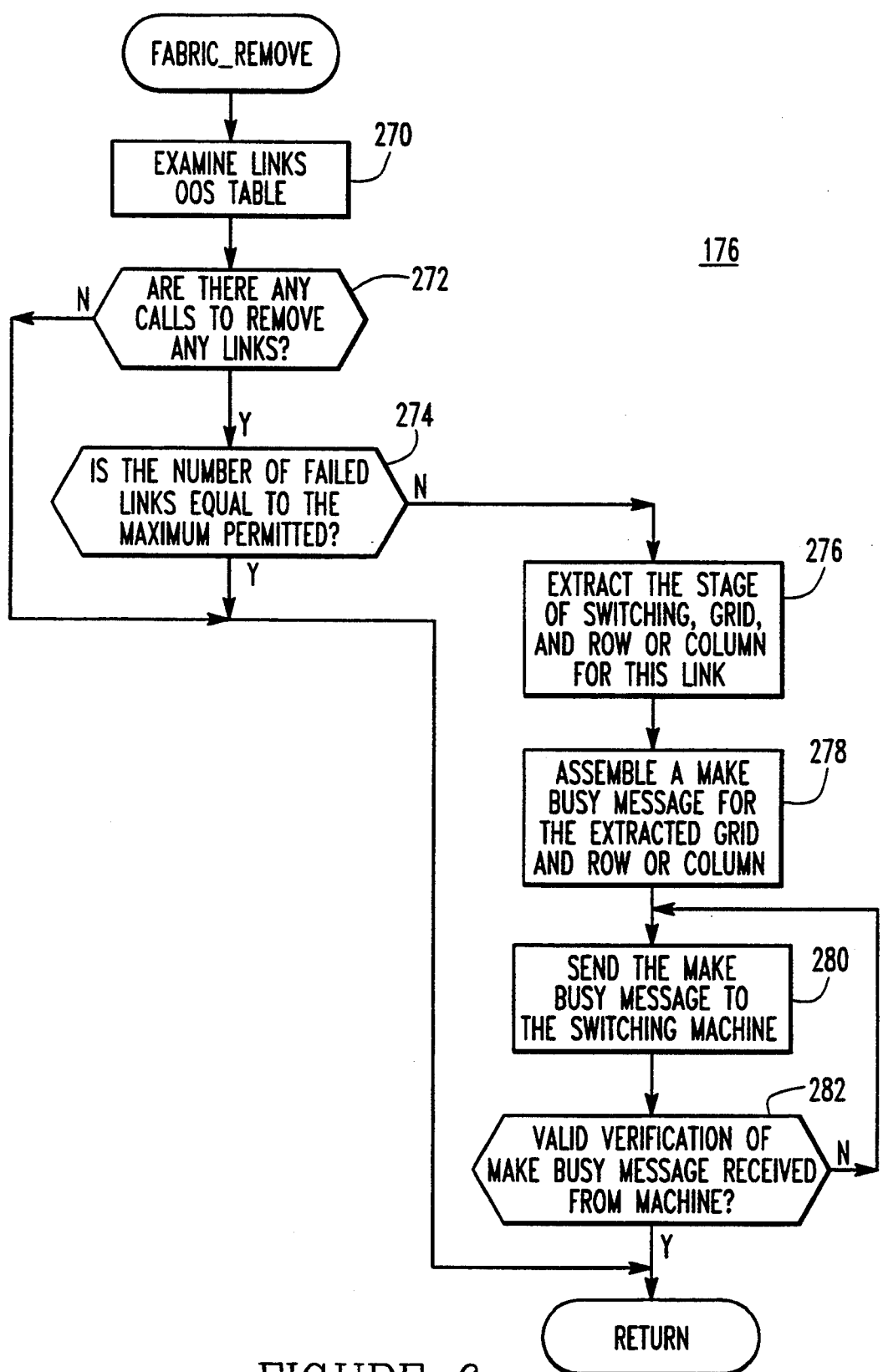
FIG. 6 is a flow chart that provides greater logic detail for a grid links out of service and fabric removal procedure included in the basic procedure of FIG. 3.

As shown in greater detail in FIG. 6, the fabric removal procedure 176 first looks at the links-out-of-service table in a block 270. A test block 272 next determines whether a call has been made to remove a link. If not, a return is made to the main procedure 150. In the main procedure 150, link removal calls are made as a result of a direct link failure or as a result of a need to remove a failed crosspoint by "disconnecting" the link to the input level of a failed crosspoint.

System design requirements limit the number of links that are permitted to be out of service. Thus, if a link removal has been requested, a test block 274 determines whether the maximum has been reached. If so, a return is made to the main procedure 150.

Otherwise, a block 276 searches the failed connection path for row and column connections to identify which link is the feeder to a failed crosspoint in the failed connection path. In the next step, a block 278 assembles a "make busy" message for the extracted grid and row and column identified for removal.

A block then directs the make busy message to the analog switching machine 12. Finally, a test block 282 provides for repeating the make busy message until a valid verification is received from the machine 12. A return is then made to the main procedure 150.

In the case of a failed network controller, the analog switching machine itself may have the capability of autonomously removing the failed controller. If the analog switching machine permits external controller selection, the analyzer system can be designated to perform this function when a network controller failure is detected.

Crosspoint Failure Detection and Removal—Greater Detail

A. Error Messages

The network controller 26 for each analog switch 12 is a switching computer that orders a particular connection path to be set up through the switch fabric (i.e., the collection of crosspoints that comprise the switching matrix). After ordering the path, the network controller 26 tests the continuity of the connection. If the connection passes the continuity test the machine 12 turns the path over to the customer, and the path stays in place until "torn down" at the end of the call holding period.

If the connection fails the continuity test, the network controller 26 records the path and sends, for example, one of the following error messages (formatted in this example for a specific type of commercially available analog switching machine), each of which contain the suspect (failed) switch path:

| | |
|---|---|
| NT02 L-T FCGF 6994694 02351 712<br>00000 12213211 3125 212 331 202 | (Reports an instance of a failed Line-Trunk section |

| | |
|---|---|
| 107521 042731 2 213 122 310 332 133121 | of a connection) |
| NT02 L-T FCGF 6991252 11721 333<br>00000 1300133 3125 133 331 111<br>123211 1016131 111 323 126 113<br>312322 | (Reports an instance of another Line-Trunk section failure of a connection) |
| NT03 L-L FCGF 6991122 01211<br>6991122 00000 1013222 1332 133<br>121 331 330123 1113210 221 131<br>302 223 100111 | (Reports an instance of a failed Line-Line section of a connection) |

The error messages are parsed and filtered for those messages which may have resulted from problems outside of the machine. This is done based upon the number of messages associated with a terminal circuit (line equipment or trunk equipment) number (objects LEN and TNN) which is greater than or equal to a user-specified threshold and not associated with the same A-link.

The A-links are the connections between Stage 1 and Stage 2 switches. If path failure messages occur for common LENs or TENs but not common Stage 1 switch output levels, the errors must be due to problems outside the switch. These messages therefore should not contribute to analysis of this machine.

After receiving a number of error messages that exceeds the user-specified threshold, the error messages are disassembled to convert from the machine-specific format to a common or generic format for analysis.

For this example, assume that the threshold is assured to have been exceeded and the three messages stated above have been received in excess of the threshold. The error messages are disassembled to extract the failed path information and discard the machine-specific format.

All messages are further disassembled to extract the stage of switching as specified below under "Message Disassembly". Prior to reaching the threshold, the appearance counts of each particular switch identification object are compared against the user-specified threshold. If the number of appearances of a particular switch within a particular concentrator/grid is greater than or equal to the user-specified threshold for switch failures, all of the Switch Path List (SPL) records to be created in the following procedure are flagged as possible candidates whose information will be used to draw switch pictures.

If the switch picture patterning algorithm fails to locate a particular crosspoint failure type, (i.e. stuck or open crosspoints or link failures) the order analysis (OA) is invoked. In this case, the uncorrelated (scattered) switch crosspoint failures may indicate failures of the network orders involved in setting up those switch paths, which must be patterned separately by OA.

After disassembling the message, the Analog Switch Analyzer records the number of occurrences of each "object", or unique location of each stage of switching Each path within each machine consists of these eight stages of switching, with each stage made up of a specific switch grid and crosspoint. The objects are the unique switches and crosspoints selected by the machine at each of the eight stages of switching.

A count is kept of the number of instances of each unique grid and crosspoint at each stage of switching. The object name is the stage of switching and the object identifier is the specific switch and crosspoint. In this example, the object count list is as follows:

| Pulse Path Object | Object Identifier | Instance Count | Failed |
|---|---|---|---|
| LSF0 | 3125 | 2 | Yes |
| LJF0 | 331 | 2 | Yes |
| LSF1 | 133 | 2 | Yes |

Assume the failure threshold in this example to be two. The crosspoints shown in the list above are implicated in the failure messages twice each in this example, thus meeting the failure threshold criteria. The object identifiers identify the particular switch grid and crosspoint (by input and output level within the switch grid).

Each message is parsed and disassembled, and a record created in a Switch Path List (SPL). Each record of the SPL contains objects and object identifiers extracted from one message. The object names are the names assigned to the data items within the messages, and are listed in the message formats for each message data item. The object identifiers are the data contained in the message for each item.

The SPL records are preferably formatted as follows:
1. Office and machine identification.
2. Failure type for this record (Line-trunk, line-line, or trunk-trunk, or line-junctor as indicated by the message type according to the message format applicable to the specific machine.
3. The data items from the message in the format: object name=object identifier.

Records, one per message, continue to be added to the SPL until all of the pending messages have been processed.

B. Creating Switch Pictures

From a network database (a table within the Analyzer software that is populated by the user with the particular analog switching machine type and equipage), the sizes of each switch grid type that was identified as containing failed crosspoints are retrieved. In the above disassembly example, the following data is retrieved:

The LSF0 (Line switch frame stage 0 switch) is 16 inputs×8 outputs

The LJF0 (Line Junctor frame stage 0 switch) is 8 inputs×8 outputs

The LSF1 (Line switch frame stage 1 switch) is 8 inputs×4 outputs

The crosspoint locations are then extracted from the object identifiers:

LSF1 Switch: 3125:
First digit=LSF1 switch no. 3
Second two digits=Input level 12
Fourth digit=Output level 5

LJF0 Switch: 331:
First digit=LJF0 switch no. 3
Second digit=Input level 3
Fourth digit=Output level 1

LSF1 Switch: 133:
First digit=LSF1 switch no. 1
Second digit=Input level 3
Third digit=Output level 3

In this example, three different switches contain failed crosspoints as shown in Tables 1, 2 and 3:

TABLE 1

| LSF1 | Switch | LLN 12 | Bay 1 | Conc 3 | | | | | |
|---|---|---|---|---|---|---|---|---|---|
| Output Levels | | | | | | | | | |
| 7 | 6 | 5 | 4 | 3 | 2 | 1 | 0 | | |
| . | . | . | . | . | . | . | . | 0 | Input |

TABLE 1-continued

| LSF1 | Switch | LLN 12 | Bay 1 | Conc 3 | | | | | |
|---|---|---|---|---|---|---|---|---|---|
| Output Levels | | | | | | | | | |
| . | . | . | . | . | . | . | . | 1 | Levels |
| . | . | . | . | . | . | . | . | 2 | |
| . | . | . | . | . | . | . | . | 3 | |
| . | . | . | . | . | . | . | . | 4 | |
| . | . | . | . | . | . | . | . | 5 | |
| . | . | . | . | . | . | . | . | 6 | |
| . | . | . | . | . | . | . | . | 7 | |
| . | . | . | . | . | . | . | . | 8 | |
| . | . | . | . | . | . | . | . | 9 | |
| . | . | . | . | . | . | . | . | 10 | |
| . | . | . | . | . | . | . | . | 11 | |
| . | . | 2 | . | . | . | . | . | 12 | |
| . | . | . | . | . | . | . | . | 13 | |
| . | . | . | . | . | . | . | . | 14 | |
| . | . | . | . | . | . | . | . | 15 | |

TABLE 2

| LJF0 | Switch 3 | LLN 13 | Bay 0 | Conc 1 | | | | | |
|---|---|---|---|---|---|---|---|---|---|
| Output Levels | | | | | | | | | |
| 7 | 6 | 5 | 4 | 3 | 2 | 1 | 0 | | |
| . | . | . | . | . | . | . | . | 0 | Input |
| . | . | . | . | . | . | . | . | 1 | Levels |
| . | . | . | . | . | . | . | . | 2 | |
| . | . | . | . | . | 2 | . | . | 3 | |
| . | . | . | . | . | . | . | . | 4 | |
| . | . | . | . | . | . | . | . | 5 | |
| . | . | . | . | . | . | . | . | 6 | |
| . | . | . | . | . | . | . | . | 7 | |

TABLE 3

| LSF1 | Switch 1 LLN 10 | Bay 3 | Conc 2 | | |
|---|---|---|---|---|---|
| Output Levels | | | | | |
| 4 | 2 | 1 | 0 | | |
| . | . | . | . | 1 | Input |
| . | . | . | . | 2 | Levels |
| 2 | . | . | . | 3 | |
| . | . | . | . | 4 | |
| . | . | . | . | 5 | |
| . | . | . | . | 6 | |
| . | . | . | . | 7 | |
| . | . | . | . | 8 | |
| . | . | . | . | 9 | |
| . | . | . | . | 10 | |
| . | . | . | . | 12 | |
| . | . | . | . | 13 | |
| . | . | . | . | 14 | |
| . | . | . | . | 15 | |

C. Interpreting Switch Pictures

A switch picture that indicates trouble may mean that a switch is defective or the root-cause may be an adjacent defective switch or link. Random and external failures are generally filtered from consideration as previously described. Certain failures generate picture patterns which serve to detect the failures.

Thus, if an analog switch has an open crosspoint, any time that crosspoint is selected by the machine the network path will fail. Consequently, an accumulation of failures will occur at the open crosspoint. The switch diagram shown in TABLE 4 indicates the pattern for this type of failure. The thirteen failures shown at input level 4, output level 3 correspond to the open crosspoint. The links for this crosspoint may be set on busy (i.e. removed from service) until appropriate repair action is taken.

TABLE 4

| . | . | . | . | . | . | . | . | - - - 0 | INPUT LEVEL |
|---|---|---|---|---|---|---|---|---|---|
| . | . | . | . | . | . | . | . | - - - 1 | C - LINKS |

TABLE 4-continued

```
  .   .   .       .   .   .   .   . ---2
  .   .   .       .   .   .   .   . ---3
  .   .   .  13   .   .   .   .   . ---4
  .   .   .       .   .   .   .   . ---5
  .   .   .       .   .   .   .   . ---6
  .   .   .       .   .   .   .   . ---7
  |   |   |   |   |   |   |   |
  0   1   2   3   4   5   6   7
         OUTPUT LEVEL
           J - LINKS
```

A crosspoint in an analog switch may be stuck in a closed position. Whenever the input level containing that crosspoint is selected, all output levels will fail except the level containing that crosspoint. The failure results because two levels are connected together and the switching equipment is designed to detect such an occurrence. Similarly, any input level except the one containing the stuck crosspoint will fail whenever the machine selects the output level containing the bad crosspoint. TABLE 5 shows the failure pattern characteristic to this case.

When the bad crosspoint is selected, no failure is detected. Since no connection can be made except through the faulty crosspoint, the stuck crosspoint must be at the intersection of the input and output levels which show the largest number of failures.

TABLE 5

```
  .   .   .   6   .   .   .   .   . ---0    INPUT LEVEL
  .   .   .   1   .   .   .   .   . ---1    C - LINKS
  .   .   .   1   .   .   .   .   . ---2
  .   .   .   4   .   .   .   .   . ---3
  .   .   .   1   .   .   .   .   . ---4
  .   .   .   3   .   .   .   .   . ---5
  7   4   1   .   5   2  13   .   . ---6
  .   .   .   2   .   .   .   .   . ---7
  |   |   |   |   |   |   |   |
  0   1   2   3   4   5   6   7
         OUTPUT LEVEL
           J - LINKS
```

A third pattern of failures on a switch picture is indicative of a problem with the link connecting adjacent analog switches rather than a problem with the analog switch itself. In this case, nearly all failures for the switch are shown on the same switch level. The switch diagrams in TABLES 6 and 7 show a typical example.

TABLE 6

```
  .   .   4   6   .   .   .   .   . ---0    INPUT LEVEL
  .   .   1   .   .   .   .   .   . ---1    A - LINKS
  .   .   .   .   .   .   .   .   . ---2
  .   .   1   .   .   .   .   .   . ---3
  .   .   2   .   .   .   .   .   . ---4
  .   .   1   .   .   .   .   .   . ---5
  .   .   .   .   .   .   .   .   . ---6
  .   .   3   .   .   .   .   .   . ---7
  |   |   |   |   |   |   |   |
  0   1   2   3   4   5   6   7
         OUTPUT LEVEL
           B - LINKS
```

TABLE 7

```
  .   .   .   .   .   .   .   .   . ---0    INPUT LEVEL
  .   .   .   .   .   .   .   .   . ---1    B - LINKS
  .   1   .   3   1   5   2   .   . ---2
  .   .   .   .   .   .   .   .   . ---3
```

TABLE 7-continued

```
  .   .   .   .   .   .   .   .   . ---4
  .   .   .   .   .   .   .   .   . ---5
  .   .   .   .   1   .   .   .   . ---6
  .   .   .   .   .   .   .   .   . ---7
  |   |   |   |   |   |   |   |
  |   |   |   |   |   |   |   |
         OUTPUT LEVEL
           C - LINKS
```

D. Patterning and Correlation of Switch Fabric Failures

Patterning and Correlation of Fabric Failures

The switch picture examples shown above are intended only to illustrate the patterning analysis of the Analog Switch Analyzer as applied to reported failed switch paths to locate the common failed crosspoints. This processing is a "front-end" process for the correlation of fabric failures, which classifies the failures into one of three possible root causes:

I. Failures Isolated to an Individual Switch
   a. Stuck Open Crosspoints
   b. Stuck Closed Crosspoints
II. Failures Between Switches
   a. Link Failures The Analog Switch Analyzer employs an "intelligent algorithm" which correlates the individual crosspoint failures (as determined by the initial common crosspoint patterning previously described) further to identify the specific failure type as isolated to specific switches or inter-switch (link) failures. This correlation capability contributes importantly to service efficiency and economy. Since the "raw" connection or path failure messages from the machine simply transmit the entire failed path, regardless of the root cause, a technician dispatched to resolve the trouble would be misled if the trouble resolution task were based solely upon each and every failed path message. These misleading indicators are described as follows:

Stuck Open Crosspoints

Stuck open crosspoints appear as isolated failures at individual crosspoint locations within the switch picture. Isolated crosspoint failures may be a result of link failures in addition to actual stuck open crosspoints. The link failure patterning algorithm is described below, and any crosspoints whose numbers of failure instances exceed the applicable threshold and are not identified as being associated with a link failure (as a result of the link failure algorithm described below) are tagged as stuck open or intermittent.

Errors in Trouble Resolution Due to Stuck Closed Crosspoints

Stuck closed crosspoints as reported in conventional switch pictures falsely indicate that each and every crosspoint within the switch and contained on the same input and output level as the stuck crosspoint is failed. The actual stuck crosspoint, located at the intersection of the input and output level containing the other "failed" crosspoints, is shown on the switch picture as NOT failed, since connections involving the stuck crosspoint will succeed but connections involving any of the other crosspoints on that input and output level will fail. As an example, consider the following switch picture generated without the patterning process applied by the Analog Switch Analyzer:

| Output Levels | | | | | | | | |
|---|---|---|---|---|---|---|---|---|
| 7 | 6 | 5 | 4 | 3 | 2 | 1 | 0 | |
| | | LSF1 | Switch 3 | LLN 12 | Bay 1 | | Conc 3 | |
| 14 | 7 | 10 | 12 | 23 | 6 | . | 9 | 0 | Input |
| 8 | 12 | 22 | 7 | 34 | . | 44 | 5 | 1 | Levels |
| . | 45 | 7 | 23 | 11 | 7 | 11 | 7 | 2 |
| 8 | . | 28 | 17 | 34 | 9 | 44 | 12 | 3 |
| . | 44 | 1 | . | . | 23 | 70 | . | 4 |
| 1 | 17 | . | . | 10 | 9 | . | . | 5 |
| . | 19 | . | . | . | 11 | 29 | 5 | 6 |
| . | 37 | 6 | 2 | . | 41 | . | . | 7 |
| 17 | 21 | . | . | 5 | 12 | . | 20 | 8 |
| 12 | 22 | . | 1 | . | 11 | 1 | 4 | 9 |
| . | 11 | . | . | 6 | 8 | . | 12 | 10 |
| . | 44 | . | . | 9 | 19 | . | . | 11 |
| 12 | 37 | 1 | . | . | 12 | 3 | 5 | 12 |
| . | 22 | . | . | 4 | 56 | . | . | 13 |
| a5 | 27 | . | . | 6 | 41 | . | . | 14 |
| . | 12 | . | . | . | 29 | . | 4 | 15 |
| | | LJF0 | Switch 2 | LLN 10 | Bay 2 | | Conc 1 | |
| 8 | 45 | 21 | 9 | 12 | 17 | 11 | 19 | 0 |
| 5 | 12 | . | 55 | 47 | 54 | 67 | 12 | 1 |
| . | . | 32 | . | . | . | . | . | 2 |
| . | 6 | 33 | . | . | . | 2 | . | 3 |
| 7 | 19 | 17 | . | 4 | 5 | 23 | . | 4 |
| . | 52 | 4 | . | . | . | 41 | . | 5 |
| . | 9 | 12 | 5 | . | . | 61 | . | 6 |
| . | 22 | 43 | . | . | . | 42 | . | 7 |

The stuck crosspoint case is indicated by each and every crosspoint in a particular input and output level as failed except the one crosspoint at the intersection of the two levels, which will not show any failures. This intersecting crosspoint is the stuck crosspoint. The patterning algorithm for stuck crosspoints operates as follows:

1. Search each input and output level of the switch picture for failed crosspoints.
2. Sort out those input and output levels that contain all but one failed crosspoint. In the above examples, the following input and output levels contain all but one failed crosspoint:
   a. Switch picture 1: Input levels 0, 1, 2, and 3. Output levels 2, 6.
   b. Switch picture 2: Input level 1. Output levels 1, 5, and 6.
3. Locate the one non-failed crosspoint on each of the levels identified in Step 2. In the case of an input level, search the output level that also contains the non-failed crosspoint. In the case of an output level, search the input level that contains the non-failed crosspoint. Verify that this (second) searched input or output level contains each and every crosspoint failed except for the one crosspoint at the intersection. If this second input or output level contains all failed crosspoints except for the one intersecting crosspoint, then the intersecting crosspoint is stuck closed.

In the above example, the following input and output level combinations intersect at a non-failed crosspoint and contain each and every other crosspoint as failed:

| | Input Level | Output Level |
|---|---|---|
| a. Switch Picture 1: | 1 | 2 |
| | 3 | 6 |
| b. Switch Picture 2: | 1 | 5 |

The crosspoints at these locations of the switches in this example are therefore stuck closed. After the patterning described in the above steps 1-3, the resulting switch pictures presented by Analog Switch Analyzer to the user will be as follows:

| Output Levels | | | | | | | | |
|---|---|---|---|---|---|---|---|---|
| 7 | 6 | 5 | 4 | 3 | 2 | 1 | 0 | |
| | | LSF1 | Switch 3 | LLN 12 | Bay 1 | | Conc 3 | |
| . | . | . | . | . | . | . | . | 0 | Input |
| . | . | . | . | . | C | . | . | 1 | Levels |
| . | . | . | . | . | . | . | . | 2 |
| . | C | . | . | . | . | . | . | 3 |
| . | . | . | . | . | . | . | . | 4 |
| . | . | . | . | . | . | . | . | 5 |
| . | . | . | . | . | . | . | . | 6 |
| . | . | . | . | . | . | . | . | 7 |
| . | . | . | . | . | . | . | . | 8 |
| . | . | . | . | . | . | . | . | 9 |
| . | . | . | . | . | . | . | . | 10 |
| . | . | . | . | . | . | . | . | 11 |
| . | . | . | . | . | . | . | . | 12 |
| . | . | . | . | . | . | . | . | 13 |
| . | . | . | . | . | . | . | . | 14 |
| . | . | . | . | . | . | . | . | 15 |
| STUCK CLOSED CROSSPOINTS (In,Out): | | | | | | | 3,6 | |
| | | | | | | | 1,2 | |
| | | LJF0 | Switch 2 | LLN 10 | Bay 2 | | Conc 1 | |
| . | . | . | . | . | . | . | . | 0 |
| . | . | C | . | . | . | . | . | 1 |
| . | . | . | . | . | . | . | . | 2 |
| . | . | . | . | . | . | . | . | 3 |
| . | . | . | . | . | . | . | . | 4 |
| . | . | . | . | . | . | . | . | 5 |
| . | . | . | . | . | . | . | . | 6 |
| . | . | . | . | . | . | . | . | 7 |
| STUCK CLOSED CROSSPOINTS (In,Out): | | | | | | | 1,5 | |

Note that these patterned and correlated switch pictures show only the actual stuck closed crosspoints. The other crosspoints that appear failed as a result of the stuck closed crosspoints are not shown. The technician can replace only these stuck crosspoints to resolve the trouble. Had the problem been "resolved" on the basis of the raw (unpatterned) switch pictures, in both cases the entire grid would probably have been replaced (due to the large number of apparent crosspoint "failures") at a much greater expense and impact on those customers served by the switch. With the ability to identify only the stuck closed crosspoints, the improvement in service efficiency and reduction of effort and expense is apparent.

Failures of links, or the connections between individual switches, still result in path failure messages containing crosspoint failure indications. In reality, however, the trouble is due to the link failure (which results in the path appearing as failed) but not due to crosspoint failures. In this case, the unpatterned switch pictures would direct the technician to replace the implicated switches, but this replacement would not resolve the problem. The indicated crosspoint failures are symptoms of the link failure. Therefore, a correlation algorithm that can identify link failures (and separate these from crosspoint failures) is required.

Link failures affect the path between a pair of switches, therefore such a failure would be manifested by a majority of failed crosspoints on the output level of the driving switch of the pair, as well as a majority of failed crosspoints on the corresponding input level of the driven switch of the pair.

As an example of link failure patterning, consider the following switch pictures (these switch pictures represent linked switches, in this case, Line Switch Frame Stage 0 and Stage 1 switches):

| | | Output Levels | | | | | | | |
|---|---|---|---|---|---|---|---|---|---|
| 7 | 6 | 5 | 4 | 3 | 2 | 1 | 0 | | |
| | | LSF0 | Switch 2 | LLN 10 | Bay 2 | Conc 1 | | | |
| . | . | . | 12 | . | 9 | . | . | 0 | Input Levels |
| . | . | 7 | . | . | . | . | . | 1 | |
| . | . | . | . | . | . | . | . | 2 | |
| . | . | 9 | 17 | . | 5 | . | . | 3 | |
| . | . | . | 20 | . | . | . | . | 4 | |
| 19 | . | . | . | . | . | . | . | 5 | |
| . | . | . | 5 | . | . | . | . | 6 | |
| . | . | . | 19 | . | . | . | 8 | 7 | |
| . | . | 8 | 55 | . | 2 | . | . | 8 | |
| . | . | . | . | . | . | . | . | 9 | |
| . | . | . | 21 | . | . | . | . | 10 | |
| . | . | . | 9 | . | . | . | . | 11 | |
| 8 | . | . | 3 | . | . | 14 | . | 12 | |
| . | . | . | . | . | . | . | . | 13 | |
| . | . | . | 12 | 7 | . | . | . | 14 | |
| | | LSF1 | Switch 5 | LLN 10 | Bay 2 | Conc 1 | | | |
| . | . | . | . | . | . | . | . | 0 | |
| 8. | . | 7 | 27 | 4 | . | 8 | . | 1 | |
| . | . | . | . | . | . | . | . | 2 | |
| . | 3 | . | . | 9 | . | . | . | 3 | |
| . | . | 17 | 8 | 2 | . | 12 | . | 4 | |
| . | . | . | . | 18 | . | . | . | 5 | |
| . | . | . | . | 6 | . | . | . | 6 | |
| . | . | . | . | 8 | . | . | . | 7 | |

The patterning algorithm for link failures functions as follows:

1. Search each input and output level of each switch picture. Count the number of failed crosspoints on each level.
2. Compare the number of failed crosspoints on each level to the total number of crosspoints. Identify those levels containing a majority of failed crosspoints. In the above example, the following levels contain a majority of failed crosspoints:

|   |   | Input Level | Output Level |
|---|---|---|---|
| a. | LSF0 switch 2 | None | 4 |
| b. | LSF1 switch 5 | 1 | 3 |
|   |   | 4 |   |

3. Search the switch path (reported with the particular failure message) for the particular switch in the next stage of switching. In the above example, the switches identified are Switch 2 in the line switch frame stage 0, and Switch 5 in the line switch frame stage 1.
4. Identify the output level of the driving switch and the input level of the driven switch. In the above example driving and driven switch types are as follows:

| Driving | Driven | Link |
|---|---|---|
| Line Equipment | Line Switch Frame Stage 0 | LEN |
| Line Switch Frame Stage 0 | Line Switch Frame Stage 1 | A |
| Line Switch Frame Stage 1 | Line Junctor Frame Stage 0 | B |
| Line Junctor Frame Stage 0 | Line Junctor Frame Stage 1 | C |
| Line Junctor Frame Stage 1 | Trunk Switch Frame Stage 0 | JNN |
| Trunk Switch Frame Stage 0 | Trunk Switch Frame Stage 1 | A |
| Trunk Switch Frame Stage 1 | Trunk Junctor Frame Stage 0 | B |
| Trunk Junctor Frame Stage 0 | Trunk Junctor Frame Stage 1 | C |
| Trunk Junctor Frame Stage 1 | Trunk Equipment | TNN |

5. On the input level of the driven switch check for a majority of failed crosspoints. This input level corresponds to the output level of the driving switch identified in Step 4.

In this example, LSF0 Switch 2 output level 4 and LSF1 Switch 5 input level 4 were identified (in the failed switch path messages) as adjacent (driving and driven) levels. These levels also were identified as containing a majority of failed crosspoints.

6. If the input level of the driving switch and the output level of the driven switch both contain a majority of failed crosspoints, the link connecting these levels of the switches is failed.

In this example, the A link connecting this set of input and output levels of the LSF0 switch 2 and LSF1 switch 5 is failed. This A-link failure is reported to the Analog Switch Analysis user.

As illustrated by this example, the link failure is patterned from its symptoms as indicated by a specific pattern of crosspoint failures. Had a repair of the switch fabric been ordered solely on the basis of the switch pictures, the technician would have incorrectly replaced both switches. Not only would this "repair" have been costly, but it would not have corrected the real problem—i.e. the link failure. The link failure would again appear as switch failures after the new switches are installed. The ability to correlate the patterns of crosspoint failures on adjacent switches to isolated link failures is therefore a very important feature of Analog Switch Analysis.

E. Equipment Removal

The Analog Switch Analyzer may automatically instruct the analog switching machine 12 to remove portions of the switch fabric that contain isolated failures from further call routing service. Equipment removal may be by ordering the machine to discontinue use of the links servicing the affected switches and input levels containing the isolated crosspoint failures.

In current operations of analog switching machines, a switch that is thought to contain a majority of failed crosspoints is removed from service by manually sending a message to the machine that instructs the network controller to render the affected link "busy". An entire switch is thus removed by sending a message to "busy" each link serving every input level of the switch. The entire switch must be (logically) removed in this manner prior to the technician physically replacing the switch, so that the machine does not attempt to set up any more connections through that particular switch.

With the Analog Switch Analyzer of the present invention, the Equipment Removal Algorithm operates as follows:

1. Count the number of crosspoints and link failures associated with the particular switch.
2. Compare the total number of crosspoint and link failures with the applicable user-specified thresholds for crosspoint and link failures, respectively.
3. Flag those links that exceed the applicable threshold as failed.
4. Flag those switches whose total number of failed crosspoints exceed the applicable threshold.
5. If link removal capability is enabled and the total number of removed links is less than the applicable maximum, construct a link removal message for every link flagged as failed.
6. If switch removal capability is enabled, and the total number of removed links is less than the applicable maximum, construct a removal message for each link servicing every input level of the switch.

7. Send the removal messages to the switching machine, verify each response, and update the links out-of-service list.

Consider the previous example in which stuck crosspoints were isolated in the LSF Stage 1 switch 3 of Line Link Network 12, bay 1, concentrator 3, and the LJF Stage 0 switch 2 of Line Link Network 10, bay 2, concentrator 3:

---

1. Identify the failed crosspoints:

LSF1 SW 3 LLN 12 Bay 1
    Conc 3:
    Input level: 1
    3
    Output level: 2
    6
    LJF0 Sw 2 LLN 10 Bay 2
    Conc 3:
    Input level: 1
    Output level: 5

2. Compare the total number of crosspoint failures with the applicable threshold (assume the threshold for crosspoint failures is 1):
    LSF1 Sw 3 contains two failed crosspoints, this switch is failed.
    LJF0 Sw 2 contains one failed crosspoint, this switch is not failed.

3. Assume link removal is enabled. Construct link removal messages (with use of the exemplary message format) identifying links to output levels 2 and 6:

FAB-MB-    LS         A         12       0         1         3         3         2         L
    |          |          |         |        |         |         |         |         |
    Message    Switch     Link      Net-     Frame     Bay       Con-      Out-      Out-
    type       Type:      Type:     work     No.       (LSF      cen-      put       put
    (Link      LS = Line  A,B,C,    No.                only)     trator    switch    level
    Make       switch     or J                                   or        driven    of
    Busy)      LJ = Line                                         Grid      by the    switch
               junctor                                                     link FAB-MB-    LJ         C         10       0         0         3         2         6         L The final 'L' in the message indicates to the machine that only this link is to be removed. An 'S' in this field indicates that the entire switch (that is, by removing all of the links serving that switch) should be removed.

4. Send the messages to the machine.
5. Verify the message responses. These responses are of the form (in the exemplary message format):
    NN05 {OK,
          NG,
          PF}.
6. If the response is NN05 Ok, update the links out-of-service list. If the response is NN05 PF, all of the A-links connected to the TSF stage 0 input switch have been removed and no further removal is possible. If the response is NN05 NG, repeat transmission of the removal message and verify the response until an NN05 OK response is received.

---

If the majority of crosspoints on a particular switch have been identified as failed, Equipment Removal orders the entire switch to be removed. This is accomplished by constructing a link removal message corresponding to every output level in the switch.

Pulse path failures are failures of pulse devices employed in the analog switching machine to select the correct switch path in response to an order sent by the network controller. Analysis of failing network orders is performed by an Order Analysis component of Analog Switch Analysis.

Network order failures are the result of failures within the signal distributors (electronic circuits that create the pulses which drive the individual crosspoint relays closed or open) or within the network controllers that generate the network orders. Since network order failures (regardless of the cause) will also result in failed switch paths to be reported by the machine, Order Analysis patterns and discriminates between switch path failures caused by actual fabric troubles and pulse path device or network controller troubles.

Network order failures due to troubles in the network controllers or pulse path devices may result in instances of fabric failures to be reported by the switching machine to the Analog Switch Analyzer. Such network order failures normally result in uncorrelated fabric failures, because the pulse devices are dynamically assigned to the required crosspoints at connection setup or teardown time. The uncorrelated fabric failures will therefore not contain any common failure points as previously described, and the switch path patterning algorithms will not be able to isolate any root-cause fabric failures. It is possible, however, that the failing network orders can be patterned to a root-cause pulse path device or network controller failure, thereby eliminating fabric failures as a possible cause of the trouble. A technician can then be dispatched to repair or replace the failed pulse device and/or network controller.

Consider the following instances of pulse path failure messages reported to Analog Switch Analysis by the machine (using the exemplary message format):

| MI | NW | ERR | 02 | 01 | 0010 | 031421 | 007775 | 022210 |
| MI | NW | ERR | 02 | 00 | 0010 | 031421 | 007775 | 022210 |
| MA | NW | RMV | 02 | 00 | 0010 | 000000 | 007775 | 022210 |
| MI | NW | ERR | 02 | 01 | 0010 | 031421 | 007775 | 022210 |
| MA | NW | RMV | 02 | 00 | 0010 | 000000 | 007775 | 022210 |
| MA | NW | RMV | 02 | 01 | 0010 | 000000 | 007764 | 027110 |
| MI | NW | ERR | 02 | 01 | 0010 | 031421 | 007775 | 022210 |

These messages are disassembled to extract the pulse path objects from the machine-specific format as follows:

| | | | | Preferred Controller | Network Controller entry | No. of errors scored against this controller |
|---|---|---|---|---|---|---|
| MI NW ERR | 02 | 00 | 001  1 | | 03  14 | 21  000775  022210 |
| Message Type (00–14) (Indicates failed network order) | Network Frame No. | Network controller | Scan Point Status (Description of error). | | Controller and network frame of interest | Failed 28-bit network order (Octal) |

The 28-bit network order is converted from octal to binary and is disassembled to form individual pulse path objects as follows:

| | | |
|---|---|---|
| 1. | Bits 502: | Order (0–15) |
| 2. | Bits 12, 11, 6, 7: | P1 Relay (0–15) |
| 3. | Bits 13, 10–8: | P2 Relay (0–15) |
| 4. | Bits 26, 19–17: | P3 Relay (0–15) |
| 5. | Bits 19–17: | G-subfield of P4 Relay ID (In format GX) (0–7) |
| | Bits 13–11: | X-subfield of P4 Relay ID (In format GX) (0–7) |
| 6. | Bits 19–17: | G-subfield of P5 Relay ID (In format GX) (0–7) |
| | Bits 26, 25–24: | X-subfield of P5 Relay ID (In format GX) (0–7) |
| 7. | Bits 19–17: | G-subfield of P5 Relay ID (In format GX) (0–7) |
| | Bits 22–20: | X-subfield of P6 Relay ID (In format GX) (0–7) |
| 8. | Bits 25–23: | G-subfield of P7 Relay ID (In format GX) (0–7) |
| | Bits 25–23: | X-subfield of P7 Relay ID (In format GX) 0–7) |
| 9. | Bits 16–14: | Concentrator Group (0–7) |
| 10. | Bits 19–17: | Grid |

Each disassembled pulse path object is sorted by object name and unique object identifier and counted. The remainder of the objects as separated from the messages are also counted.

Upon disassembly of this collection of messages, we have the following pulse path objects and the number of occurrences of each unique pulse path object. Each pulse path object and object identifier is scored and compared against a user-specified threshold for instances of pulse path failures. Assume the threshold in this example is 3, therefore any unique pulse path object occurring more than three times in network order failure messages will be considered failed:

| Pulse Path Object | Object Identifier | Instance Count | Failed |
|---|---|---|---|
| Network Frame | 02 | 7 | Yes |
| Network Controller Used | 0 | 6 | Yes |
| | 1 | 2 | No |
| Order | 17 | 6 | Yes |
| | 15 | 1 | No |
| P1 Relay | 07 | 7 | Yes |
| P2 Relay | 07 | 7 | Yes |
| P3 Relay | 1 | 7 | Yes |
| P4 Relay | 10 | 7 | Yes |
| P5 Relay | 10 | 7 | Yes |
| P6 Relay | 21 | 6 | Yes |
| | 11 | 1 | No |
| P7 Relay | 21 | 6 | Yes |
| | 71 | 1 | No |
| Concentrator Group | 0 | 7 | Yes |
| Grid | 1 | 7 | Yes |

The failed pulse path objects are used to produce an output report which contains a list of the failed objects. This list of failed pulse path objects identifies the common failure points in the machine pulse path devices (i.e. the specific failed devices). Using this list, and a translation table (specific to the machine type and configuration), a technician can physically identify the failed device within the network frame for repair or replacement.

Note that the pulse path failures may result in generation of uncorrelated fabric failure information. These fabric failure messages will not result in a correlated failure to be patterned from the Fabric Analysis processes previously described. The pattern pulse path device failure will then eliminate the corresponding fabric failure messages as the cause of the underlying problem. The last step in Analog Switch Analysis patterning is therefore to search the fabric failure message records for any messages identifying the same network that has patterned pulse path failures. The patterned pulse path failures for that particular network are, in turn, output as the root-cause failures and eliminate the apparent fabric failures as candidates for the root-cause problem. In previous manual methods of analysis, such as the currently used methods related to one of the AT&T systems, much laborious checking and re-checking of outputs is required to determine the root-cause failure, and the results of this laborious manual process are not always conclusive.

Programmed Procedure Detail for Failure Patterning, Patterning Algorithm, Equipment Removal Message Filtering Messages are parsed and filtered for those messages which may have resulted from outside plant problems. This is done based upon the number of messages associated with a terminal circuit number (objects LEN and TNN) which is greater than or equal to a user-specified threshold and not associated with the same A-link.

All remaining messages are further disassembled to extract the stage of switching as specified below under "Message Disassembly". Prior to thresholding the appearance counts of the same switch path object identifiers as described below, the appearance counts of each particular switch identification object should be compared against the user-specified threshold. If the number of appearances of a particular switch within a particular concentrator/grid is greater than or equal to the user-specified threshold for switch failures, all of the Switch Path List (SPL) records to be created in the following procedure should be flagged as possible candidates whose information will be used to draw switch pictures.

If the switch picture interpretation algorithm fails to locate a particular crosspoint failure type, (i.e. stuck or open crosspoints or link failures) the order analysis (OA) should be invoked. In this case, the uncorrelated (scattered) switch crosspoint failures may indicate failures of the network orders involved in setting up those switch paths, which must be patterned separately by OA. This procedure is described under "Order Analysis".

Message Disassembly

Each message is parsed and disassembled, and a record created in a Switch Path List (SPL). Each record of the SPL contains the objects and object identifiers extracted from one message. The object names are the names assigned to the data items within the messages, and are listed in the message formats above for each message data item. The object identifiers are the data contained in the message for each item.

Populating the SPL

The SPL records are formatted as follows:
1. Office and machine identification.
2. Failure type for this record (Line-trunk, line-line, or trunk-trunk, or line-Junctor as indicated by the message type).
3. The data items from the message in the format: object name=object identifier.

Each record, one per message, continues to be added to the SPL until all of the pending messages have been processed.

Failure Patterning

The records of the SPL are used to identify the common switch path failure points and to produce the summary report. The contents of the records are examined and a failure count is made of each object which is compared with the applicable thresholds to produce a record of machines and switch path object failures. The patterning process is performed as follows:
1. Each record of the SPL is sorted by office and machine identification, thus placing all records of messages from the same machine into a contiguous block.
2. The individual records containing the same office and machine IDs are combined into one record containing one office and one machine ID.
3. Each JNNL (Line junctor number), JNNT (Trunk junctor number), TNN (Trunk identification), and LEN (Line equipment number) object identifier is parsed. The resulting parsed object identifiers are stored with new object names in each record as follows:

For JNNL: JNNL is in the format: aabcde; aa=- Line link network (LLNJ), b=Line Junctor switch frame (LJSF), c=Grid no. (LJGNO), d=Switch no. (LJSNO), and e=Level (LJSLEV).

For JNNT: JNNT is the format: aabcde; aa=- Trunk link network (TLNJ), b=Trunk junctor switch frame (TJSF), c=Grid no. (TJGNO), d=Switch no. (TJSNO), and e=Level (TJSLEV).

For TNN: TNN is in the format: aabcde; aa=- Trunk link network (TLNT), b=Trunk switch (TSW), c=Grid no. (TJGNO), d=Switch no. (TSNO), and e=Level (TSLEV).

For LENs LEN is in the format: aabcdeff; aa=- Line link network (LLNL), b=Line switch frame (LSF), c=Bay no. (BYNO), d=Concentrator no. (CONCNO), e=Switch no. (LSNO), and ff=Level (LSLEV).

4. Count the number of instances (occurrences) of each unique object name and object identifier. For example, if LSFO=2027 appears five times in the record of a particular machine, an instance count of 5 is associated with this object. The counts are stored along with each unique object and identifier.
5. The objects are sorted by object name, thus producing a compressed record. Each compressed record is a linked list containing only one list of object names, all of the object identifiers linked to each object name, and the instance counts linked to each object identifier.
6. The compressed records are stored in the Switch Path Failure Table (SPFT).
7. The instance counts of each object identifier is compared to the failure thresholds for switch path object failures. These thresholds are user-specified for switches, junctors, and trunks.
8. Those object identifiers whose instance counts exceed the applicable thresholds are marked as failed. The marked objects identify the switch paths whose failures will be listed in the output report.
9. The stage of switching is identified for each switch path from the failed switch path object names in each path. The stage of switching is identical to the switch path object name that contains the highest instance (failure) count for that path. For example, the stage of switching will be Line Switch 0 (ls0), Line Switch 1 (ls1), Line Junctor 0 (lj0), Line Junctor 1 (lj1), Trunk Switch 0 (ts0), and Trunk Switch 1 (ts1).
10. The stage of switching is linked to each path in the record.
11. The output report and switch pictures are produced below under "Outputs of Fabric Analysis".

Fabric Analysis Algorithm

The fabric analysis algorithm disassemble the MA NW and MI NW messages, which are sent by the switching machine whenever a switch path fails in the course of setting up or tearing down a connection. When the switching machine attempts to set up a connection using a particular path, the network controller tests the continuity of the metallic tip and ring path. If this continuity test fails, the switch will send an error message, and attempt to set up the connection through another path.

Message Thresholding

Whenever a candidate message is received, the message is stored in the NMA message log along with the identification of the switching machine that sent the message. No disassembly or analysis of the messages is performed until the number of these messages from any particular switch exceed the user-settable threshold. The default for the message threshold is eight (8) messages.

Message Format

--- tt Ma NW ADR fg hi mmmc ttnnde nopqrs tuvwxy

-continued

```
tt MI NW TVF fg mm nopqrs tuvwxy
Where:
a =      A (The number of bad address entries has exceed
         the threshold)
         I (A bad address entry has been placed in the
         Bad Address list without exceeding the threshold).
fg =     Network frame (Decimal 0-14).
mm =     Trouble number.
h =      Controller used when first trouble occurred (0, 1).
i =      CU left on-line by the trouble recovery program
         (0, 1).
mmm =    TSF scan point status (000-111).
c =      Preferred controller (0, 1).
tttnnde =  Bad address (Octal 0000000-7777777).
nopqrs = Network order, least significant 14 bits (Octal).
tuvwxy = Network order, most significant 14 bits (Octal).
```

Message Disassembly

After receiving a set of messages (of the specified types, whose number exceeds the message threshold) from a switching machine, the Analog Switch Analysis message disassembler retrieves the messages received after exceeding the threshold from the message log. The messages are disassembled and the extracted information is placed in lists as described below.

1. Extract the mmm field (Ma NW ADR message only), convert to one octal digit, and store as the scan point status (SPS).
2. Extract the network order (fields: nopqrs, tuvxy). Convert the octal digits to binary.
3. Concatenate the least-significant 14 bits of each field (right-Justified), to assemble the 28-bit network order. Field nopqrs (least-significant) appears on the right-hand side of the concatenation, and field tuvwxy (most significant) on the left-hand side.
4. Examine the scan point status (SPS or mmm field). If SPS=3, indicating an FCG (Frame Cross to Ground error), proceed with Fabric Analysis processing. If SPS is any other value, proceed with Order Analysis processing after message disassembly.
5. If an FCG error is indicated, proceed to populate a new list, the Switch Path List (SPL), with the information contained in the network order. In populating the SPL, the individual data items may be identified using a tag=value syntax, e.g., input_level=nnn.

Population of the Switch Path List (SPL)

The SPL holds a number of records, I through N, each record containing the information obtained by disassembling the message. Each record of the SPL is generated as follows:

1. Store the office alias and switching machine CLLI identification at the beginning of the record.
2. Store the network and frame numbers.
3. Extract and concatenate the specified bits of the 28-bit network order thus forming separate data items. The disassembled network order describes the failed switch path reported in the message. (Note that the 2ESS and 2BESS machines code the switch path as part of the network order, whereas in the 1ESS and 1AESS messages the switch path is reported using separate data items). Convert the binary values of each data item to octal digits and store the converted data items, with a unique tag name for each item, in the SPL record in the following order:

| | |
|---|---|
| 1. | Bits 13-8: CO Switch |
| 2. | Bits 16-14: Concentrator Group |
| 3. | Bits 13-11: Concentrator |
| 4. | Bits 10-8: Stage 0 Input Switch |
| 5. | Bits 7,6: Stage 0 Input Level |
| 6. | Bits 26,19: Stage 0 Output Level |
| 7. | Bits 26,19: Stage 1 Output Switch |
| 8. | Bits 10-8: Stage 1 Input Level |
| 9. | Bits 18,17: Stage 1 Output Level |
| 10. | Bits 19-17: Grid |
| 11. | Bits 19-17: G-subfield of F-Switch (in format GS) |
| | Bits 26,15,14: S-subfield of F-Switch |
| 12. | Bits 26,15,14: Stage 0 Input Switch |
| 13. | Bits 13-11: Stage 0 Input Level |
| 14. | Bits 24-22: Stage 0 Output Level |
| 15. | Bits 24-22: Stage 1 Output Switch |
| 16. | Bits 26,15,14: Stage 1 Input Level |
| 17. | Bits 21-19: Stage 1 Output Level |
| 18. | Bits 26,19: T-subfield of A-Link identity (in format TPCS) |
| | Bits 16-14: P-subfield of A-Link identity |
| | Bits 13-11: C-subfield of A-Link identity |
| | Bits 10-8: S-subfield of A-Line identity |
| 19. | Bits 15,14: P-subfield of B-Link identity (in format PCBG) |
| | Bits 13-11: C-subfield of B-Link identity |
| | Bit 27: B-subfield of B-Link identity |
| | Bits 19-17: G-subfield of B-Link identity |
| 20. | Bits 26,15,14: M-subfield of C-Link identity (in format MGO) |
| | Bits 19-17: G-subfield of C-Link identity |
| | Bits 25-23: O-subfield of C-Link identity |
| 21. | Bits 25-23: O-subfield of Junctor identity (in format OLG) |
| | Bits 22-20: L-subfield of Junctor identity |
| | Bits 19-17: G-subfield of Junctor identity |

4. Repeat the above procedure, beginning with Step 1, until all of the messages have been processed. The SPL should not contain one record corresponding to each message.

Failure Patterning

The information contained within the SPL is used to construct patterns of switch path failures so that the failure points can be localized.

Switch Path Patterning

The SPL contains lists defining switch paths (that is, metallic tip and ring paths) that failed the continuity test after the switch attempts to set up the path. The switch path patterning component of the Fabric Analysis identifies common failure points in each stage of switching. The patterning is accomplished by sorting and searching the SPL.

1. Sort the records in the SPL by switching machine identification. Each record containing messages from the same machine should be placed sequentially in the same block.
2. Within each block of the SPL (each block corresponding to one machine) count the number of appearances of each object in the following list. For example, with an object name and object ID of Stage 0 input switch 4, increment the count for object name Stage 0 input switch and object ID 4:

Object Names:
Network
Frame
Concentrator:
  CO Switch
  Concentrator group

Concentrator
    Stage 0 input switch
    Stage 0 input level
    Stage 0 output level
    Stage 1 output switch
    Stage 1 input level
    Stage 1 output level
Grid:
    Grid
    F-Switch
    Stage 0 input switch
    Stage 0 input level
    Stage 0 output level
    Stage 1 output switch
    Stage 1 input level
    Stage 1 output level
    A-link identity (TPCS)
    B-link identity (PCBG)
    C-link identity (MGO)
    Junctor identity (OLG)
3. Construct a new list, the Switch Path Failure table (SPFT). Each record of the SPFT consists of machine ID, office alias, numbers, object name and identification, and number of instances of each object as determined from the above procedure.
4. Combine all of the SPFT records from each machine into the same record. Each record consists of: machine ID, office alias, object name, object ID, and appearance count for each object ID.
5. Combine all objects of the same name (within each machine record) of the SPFT by merging all of the object IDs associated with like object names. The merged records should then contain only one occurrence of each object name (specified in the above list), and all of the object IDs and appearance counts listed associated with each object name.
6. Compare the number of instances of each network, frame, grid, input/output switch, and input/output level with the user-specified thresholds for failures of networks, frames, grids, switches, and input/output levels. Flag those object IDs having appearance (i.e., failure) counts that have matched or exceeded the thresholds. Store the flag with each object ID in the SPFT.

Automatic Switch Picture Interpretation

A major feature of Fabric Analysis outputs is Automatic Switch Picture Interpretation. A patterning Algorithm examines switch grid pictures to locate open and stuck crosspoints and link failures from the switch picture patterns. The automatic switch picture interpretation algorithm operates on switch pictures generated from switch path failure messages, and the operation of the algorithm is identical for any supported machine type.

Outputs of Switch Picture Interpretation

The output of switch picture interpretation is a report containing the identity of the switch and the failed crosspoints as identified from the algorithms described below. This information includes:
1. Office alias and machine identification.
2. IDs of the objects comprising the switch path: network, frame, concentrator/grid, and switch.
3. Crosspoint input and output level.
4. Type of failure of each crosspoint (open or stuck), or link failure.
5. Grid model and location.

Patterning Algorithm, Common Operations

The following operations produce the data structures that are searched for crosspoint failure patterns:
1. Search each record in the SPFT for the object identifiers associated with the input and output level object names of the concentrator and grid stage 0 and 1 switches.
2. Sort the input and output level object identifiers (for each switch object name) in order of ascending input, then output level. Store the sorted objects in a separate list containing the switch object name and sorted level IDs, and each cross point failure count.

Patterning Algorithm, Open Crosspoints

An open crosspoint causes a failure of a connection through that particular crosspoint. To locate open crosspoints, the following applies:
1. Search the sorted input and output levels list (produced by the common operations described above) and verify that the sorted list does not contain every input and output level for each particular concentrator/grid and switch object. Link failures may cause crosspoints to appear falsely open in grids when, in fact, the actual failure is in a link connecting two switches. To eliminate link failures from appearing as multiple open crosspoints in the patterning, remove any input and output levels that are associated with out-of-service links from the sorted list. The list of links out-of-service should be checked to identify the affected switches and levels.
2. Flag the input and output levels in the sorted list, and identify these as open crosspoints on the switch picture along with the failure count for each.

Stuck Crosspoints

A stuck (permanently closed) crosspoint causes a failure of connections through any of the crosspoints in the grid input level and grid output level containing the stuck crosspoint. A connection attempt through the stuck crosspoint succeeds.

To locate stuck crosspoints, the following applies:
1. Search the sorted input levels (for each switch) for consecutive numerically-increasing sequences. If one level is missing from the input level sequence, search the list for all crosspoints on the missing input level. Search the output levels of those crosspoints for a consecutive numerically-increasing output level sequence. If the output level sequence contains all of the output levels except one, the crosspoint at the missing input and output level is stuck. If the switch grid being examined contains any out of service links, failed crosspoints on those links will be masked, as the controller will not attempt a connection path through any of the crosspoints on out-of-service links. If the algorithm checking for stuck crosspoints expects every single crosspoint on the suspect input or output link to be failed, the stuck crosspoint algorithm may fail to locate stuck crosspoints in grids with out-of-service links. Therefore, the patterning algorithm must be able to identify a subset of the entire link's crosspoints in the numerically-increasing sequence as well as the entire set of crosspoints.

2. Flag the input and output levels in the sorted list, and identify the crosspoints at the intersection of those input and output levels as stuck crosspoints on the switch picture along. The stuck crosspoints will be those that indicate no failures, and are not on a level containing removed links.

Link Failures

A link failure is an open or cross in a link connecting adjacent switches. Link failures are characterized by a majority of failed crosspoint indications on one input level or output level of a switch grid. In these cases, several crosspoints on input and output levels in adjacent switches connected by the failed link will indicate non-zero failure counts. Link failure patterning therefore requires identifying a set of failed crosspoints on an output level of a particular switch and another set of failed crosspoints on the corresponding input level of the adjacent switch connected by the link.

To locate link failures, the following steps are employed:

1. Search the SPFT. Compare the number of failed crosspoints, among all of the records, on every input level of every output switch with the number of failed crosspoints on the corresponding output level of the prior input switch as specified in the switching path contained in the SPFT record.
2. Compare the number of failed crosspoints on the corresponding levels with the total number of failed crosspoints on that level. A majority of the total number of crosspoints identified as failed in both corresponding levels indicates a failure of the link.
3. Flag the failed link in the SPFT.
4. Retrieve the identify of the failed link by reading the stage of switching from this record of the SPFT. The stage of switching (Network, concentrator group, concentrator/grid, switch, output level (of source switch), input level (of destination switch), and link type (A, B, or C link) identifies the failed link.
5. Retrieve the pending trouble ticket number for this link from the analog switch analysis trouble ticket list.
6. Add this link identity to the links out-of-service list.
7. When the link is returned to service (via an NMA operator-issued link return to service message), the machine will send a link restored message to NMA. Upon receiving any link restored message from the machine, Analog Switch Analysis should search the links out-of-service list for the link reported in the link restored message. If this link appears in the list, the link identity should be removed from the links out-of-service list.

Dynamic Map of Links Out-of-Service

The dynamic map of links out-of-service is displayed on a screen dedicated for this purpose. The map presents the links out-of-service list and any changes to the list as they occur in real time. When a link is identified as out-of-service, the link is added to the map and the screen is updated. When a currently out-of-service link is returned to service, the link is removed from the map and the screen is updated. The map is generated in the following format:

Office and machine identification (CLLI code)

-continued

```
                     Current time and date
Stage Type Switch Link A I/O Link B I/O Link C I/O TTN
 aa    b    cc      de         fg         hi       j
attention link not o/s > > aa b cc de fg hi j < < tt still pending!!
```
Where: aa = Stage: Trunk junctor (tj), trunk switch (ts), line junctor (lj), line switch (ls).
     b = Link type (from stage of switching): Link A (a), link B (b), link C (c), or junctor (j).
    cc = Switch number (from stage of switching).
    de = Link A input (d) and output (e) levels.
    fg = Link B input (f) and output (g) levels.
    hi = Link C input (h) and output (i) levels.
     j = Trouble ticket number associated with this link.

The "attention" message highlights any links that have been restored to service and still have open or pending trouble tickets.

Removal of Equipment

Analog Switch Analysis may order removal of equipment from service based upon patterned failures. The level of equipment removal is selectable by the user. Based upon the user selection of removal level, a patterned failure orders removal of the lowest level of equipment consistent with the failure level and the user selection. The highest level of equipment removal allowed is user-selectable for a particular machine.

Removal is initiated in the machine by initiating a message dialogue from Analog Switch Analysis to the machine in order to localize the trouble. As a result of the information obtained from the machine during this dialogue, Analog Switch Analysis sends the appropriate set of link removal messages to the machine to effect the equipment removal.

Equipment removal levels, from highest to lowest, are Concentrator group, grid, switch, level, and link. Concentrator groups are the highest allowed equipment removal.

Mapping of Link Removal to Equipment

Equipment removal is accomplished by removing all of the links associated with that level of equipment. This hierarchy of removal is implemented via the following equipment removal schedule:

To remove the Link: Remove the one link, only.
Level: Remove the links of the input levels to be removed.
Switch: Remove all of the input levels in the switch.
Grid/concentrator: Remove ell of the switches in the grid or concentrator.
Concentrator group: Remove the links of all of grids/concentrators in the concentrator group.

Removal Dialogue and Message Formatting

The thresholding process that produces the SPFT determines the lowest level of equipment to be removed. When a failure has been patterned to a particular object (link, level, switch, grid/concentrator, or concentrator group) the equipment identified by the object name and identifier is removed.

Removing Links

If a link failure has been patterned, the following procedure is performed to remove the link: For A-Links:

1. Search the SPFT for any link object identifiers marked as failed.

2. Retrieve the network number (ff=0–14) and A-link identity TPCS from the SPFT record. The subfields of TPCS are: T=output level of stage 0 switch (0–3), P=concentrator group (0–7), C=concentrator (0–7), and S=number of stage 0 switch (0–7).
3. Assemble the following link Out of Service request message: M LK:AOS:ff TPCS!
4. Send the message to the machine.
5. Verify the machine response as described below.

For B-Links:
1. Retrieve the network number (ff=0–14) and A-link identity PCBG from the SPFT record. The subfields of PCBG are: P=concentrator group (0–7), C=concentrator (0–7), B=B-link path bit (0 or 1), and G=grid (0–7).
2. Assemble the following link Out of Service request message: M LK:BOS:ff PCBG!
3. Send the message to the machine.
4. Verify the machine response as described below.

For C-Links:
1. Retrieve the network number (ff=0–14) and A-link identity MGO from the SPFT record. The subfields of MGO are: M=stage 0 switch number (3rd stage of switching) (0–7), G=grid (0–7), and 0=output level on stage 0 switch.
2. Assemble the following link Out of Service request message: M LK:COS:ff MGO!
3. Send the message to the machine.
4. Verify the machine response as described below.

For Junctors:
1. Retrieve the network number (ff=0–14) and junctor termination identity OLG from the SPFT record. The subfields of OLG are: 0=stage 1 switch number (4the stage of switching) (0–7), G=output level on stage 1 switch (0–7), and G=Grid number (0–7).
2. Assemble the following link Out of Service request message: M LK:JOS:ff OLG!
3. Send the message to the machine.
4. Verify the machine response as described below.

For each link out of service request message sent verify one of the following responses from the machine:
1. If response=OK, update the links out-of-service list.
2. If response=PF, update the links out-of-service list, ignore the forthcoming MR LK AOS, MR LK BOS, MR LK COS, or MR LK SRV message from the machine.
3. If response=RL, Repeat transmission of the link out of service request message in five minute intervals until an OK or PF response is received.
4. If response=NG, verify that the network number is not greater than 14. Resend the message immediately and repeat transmission of the link out of service request message in five minute intervals until an OK or PF response is received.

Removing Levels

If the patterning process determines that a crosspoint is open or stuck, Analog Switch Analysis removes the links connecting the corresponding levels of the switch containing the stuck or open crosspoints. The level removal is performed as follows:
1. Search the SPFT record for every level object identifier marked as failed. The input and output levels so marked for each machine identify failed crosspoints. Store the output levels of each failed crosspoint.
2. Store the network number and concentrator group.
3. Identify the stage of switching associated with each failed crosspoint. To do this, search the SPFT for the switch path object names of the switch containing each marked crosspoint. For each switch so identified, determine the stage of switching.
4. If the object name of the switch is: "Concentrator stage 0 input switch", set a code indicating the stage of switching to 1.
5. If the object name of the switch is: "Concentrator stage 1 output switch", set a code indicating the stage of switching to 2.
6. If the object name of the switch is: "Grid stage 0 input switch", set a code indicating the stage of switching to 3.
7. If the object name of the switch is: "Grid stage 1 output switch" set a code indicating the stage of switching to 4.
8. For each occurrence of a failed crosspoint remove the links corresponding to the input levels as follows: if the stage code is 1, send a M LK:AOS message for every failed crosspoint. The message will contain the output level (of the Concentrator stage 0 input switch) containing the failed crosspoint, network number, and concentrator group that was retrieved from the SPFT. Follow the procedure outlined above under "Removing Links, A-Links".
9. If the stage code is 2, follow the previous step except that a M LK:BOS message will be sent for each failed crosspoint. The BG field of the M LK:BOS message should be set to the switch number and output level (of the Concentrator stage 1 output switch) containing the failed crosspoint. Follow the procedure outlined above under "Removing Links, B-Links".
10. If the stage code is 3, follow the previous step except that a M LK:COS message will be sent for each failed crosspoint. The message will contain the output level (of the Grid stage 0 input switch) containing the failed crosspoint, network number, number of the Grid stage 0 input switch, and grid number.
11. If the stage code is 4, follow the previous step except that a M LK:JOS message will be sent for each failed crosspoint. The O, L, and G fields of the M LK:JOS message should be set to the switch number, output level containing the failed crosspoint (of the Grid stage 1 output switch), and the grid number.

This procedure generates an amount of link removal messages equal to the number of unique levels containing failed crosspoints.

Removing Switches

If the patterning process determines that a switch has failed, Analog Switch Analysis removes the entire switch. Switches are removed by removing all of the links associated with every level in the switch. To remove a switch, the following procedure is performed:
1. Search the SPFT for any switch object name marked as failed.
2. Identify the switch object name and set the stage code as described above under "Removing Levels".

3. If the stage code is 1, remove the Concentrator stage 0 input switch by sending four M LK:AOS messages, one for each A-Link from each output level on the switch. These messages should contain the network number, output levels (0 to 3, one per message), concentrator group containing the failed switch, concentrator number containing the failed switch, and the number of the Concentrator stage 0 input switch. For each of the four messages, follow the procedure outlined above under "Removing Links, A-Links".
4. If the stage code is 2, remove the Concentrator stage 1 output switch by sending four M LK:BOS messages, one for each B-Link from each output level on the switch. These messages should contain the network number, output levels (0 to 3, one per message), concentrator group containing the failed switch, concentrator number containing the failed switch, B-link path bit, and grid number containing the failed switch. For each of the four messages, follow the procedure outlined above under "Removing Links, B-Links".
5. If the stage code is 3, remove the Grid stage 0 input switch by sending eight M LK:COS messages, one for each link from each output level on the switch. These messages should contain the network number, output levels (0 to 7, one per message), grid number containing the failed switch, and the number of the Grid stage 0 input switch. For each of the eight messages, follow the procedure outlined above under "Removing Links, C-Links".
6. If the stage code is 4, remove the Grid stage 1 output switch by sending eight M LK:JOS messages, one for each junctor from each output level on the switch. These messages should contain the network number, output levels (0 to 7, one per message), grid number containing the failed switch, and the number of the failed Grid stage 1 output switch. For each of the eight messages, follow the procedure outlined above under "Removing Links, Junctors".

This procedure generates a quantity of link removal messages equal to the sum of 4 times the number of failed Concentrator switches and 8 times the number of failed Grid switches.

Removing Grids or Concentrators

If the patterning process indicates the failure of a grid, all of the switches in that grid or concentrator must be removed. This requires multiple executions of the switch removal process described in the previous section. A grid or concentrator is removed as follows:

1. Search the SPFT for any grid and concentrator object name marked as failed.
2. Remove each switch in the grid by sending eight M LK:COS messages for each of the eight Grid stage 0 input switches. Follow the switch removal procedure described above, under "Removing Switches (stage code 3), eight times for switches 0-7. Also send eight M LK:JOS messages for each of the eight Grid stage 1 output switches. Follow the procedure described under "Removing Switches (stage code 4), eight times for switches 0-7.
3. Remove each switch in the concentrator by sending four M LK:AOS messages for each of the eight Concentrator stage 0 input switches. Follow the switch removal procedure described above, under "Removing Switches (stage code 1), eight times for switches 0-7. Also send four M LK:BOS messages to remove the four Concentrator stage 1 output switches. Follow the procedure described under "Removing Switches (stage code 2), four times for switches 0-3.

This procedure generates a number of link removal messages equal to 128 times the number of failed grids, or times the number of failed concentrators.

Removing Concentrator Groups

If the patterning process indicates the failure of a concentrator group, all of the grids and concentrators in that concentrator group must be removed. This requires multiple executions of the grid and concentrator removal processes described in the previous section. Concentrator group removal is the highest level of equipment removal ordered by Analog Switch Analysis. A concentrator group is removed as follows:

1. Search the SPFT for any concentrator group object name marked as failed.
2. Remove all of the concentrators in the concentrator group by executing the concentrator removal procedure eight times, one for each concentrator (0-7) in the concentrator group. There are four concentrator groups, 0-3, in machines with 2:1 concentration ratio, and eight concentrator groups, 0-7, in machines with 4:1 concentration ratio.

This procedure generates 1536 link removal messages per concentrator group with 2:1 concentration, or messages per concentrator group with 451 concentration.

Programmed Procedure Detail for Pulse Path Failure Patterning, Patterning Algorithm, and Correlation of Pulse Path Failures with Fabric Failures to Eliminate "Symptom" Fabric "Failures"

Message Filtering

Incoming messages from network elements are parsed and filtered for those messages identifying network order failures. As previously described, incoming messages may or may not originate from analog switching machines, and if originating from an analog switching machine, the messages are further filtered to separate network fabric failure messages from network order failure messages, and from unknown message types.

Upon separating the messages by message type, parsing the messages, and further processing the messages as previously described by the fabric analysis programming description and procedure flow diagrams, all of the remaining messages that are not of an unknown type are therefore network order failure messages. The network order failure messages are parsed and disassembled as described below under "Message Disassembly".

As with Fabric Analysis, prior to thresholding the appearance counts of each particular pulse path object identifier as described below, the appearance count of each particular pulse path object identifier is compared against the user-specified threshold. If the number of appearances of a particular pulse path object identifier within N past pulse path failure messages exceeds the applicable user-specified threshold for pulse path device failures, that particular pulse path object is flagged as a candidate for failure analysis by the Order Analysis procedure OA_ANALYSIS.

Message Disassembly

Each network order failure message is parsed and disassembled in accordance with the message rules for that particular analog switching machine and message type. For each disassembled network order failure message, a record is created in the Pulse Path List (PPL). Each record of the PPL contains the pulse path object identifiers extracted from one network order failure message. The objects are identified by object names and identifiers. The object names are the names assigned to each pulse path device identified in the network order messages and the object identifier contains the data for each pulse path object.

Populating the PPL

The PPL records are formatted as follows:
1. Office and Machine identification.
2. Failure type (in this case, the failure type is "FAILED NETWORK ORDER").
3. Network frame number.
4. Network controller number.
5. Preferred controller.
6. Controller and network frame of interest.
7. Number of errors scored against this controller.
8. Numerical copy of the network order that failed.

Each record, one per network order failure message, continues to be added to the PPL until all of the pending messages have been processed.

Failure Patterning

The records of the PPL are used to identify the common pulse path objects, which may be pulse devices (electronic circuits that accept the network order from the network controller, and translate the network order into requests for those switch fabric relays that must be actuated for the desired connection, and create a high-voltage shaped pulse for each selected relay that will drive the selected relays into the closed, and later open, position required to set up or tear down the requested connection), pulse selectors (electronic circuits that assign a set of pulse devices to the connection setup or teardown based upon which pulse devices are available and not in use at the particular time of setup or teardown), or the entire network controller. The individual pulse path objects are extracted by disassembling the numerical network order as described below. The patterning process is performed as follows:

1. Each record of the PPL is sorted by office and machine identification, thus placing all records of network order failure messages from the same machine into a contiguous block.
2. The individual records of the PPL containing the same office and machine IDs are combined into one record containing one office and one machine ID.
3. The numerical network order is parsed and disassembled as described below under "Message Format" and "Message Disassembly", resulting in the individual pulse path objects.
4. Each Network Frame, Network Controller Used, Order, P1 Relay, P2 Relay, P3 Relay, P4 Relay, P5 Relay, P6 Relay, P7 Relay, Concentrator Group, and Grid pulse path object is parsed. The resulting parsed pulse path object identifiers are stored with new object names as follows:

For Network Frame, NF: NF is in the format aa, where aa=0–15.
   For Network controller used, NC: NC is in the format a, where a=0–3.
   For Order, OR: OR is in the format aa, where aa=0–15.
   For P1 Relay, P1R: P1R is in the format aa, where aa=0–15.
   For P2 Relay, P2R: P2R is in the format aa, where aa=0–15.
   For P3 Relay, P3R: P3R is in the format aa, where aa=0–15.
   For P4 Relay, P4R: P4R is in the format aa, where aa=0–77.
   For P5 Relay, P5R: P5R is in the format aa, where aa=0–77.
   For P6 Relay, P6R: P6R is in the format aa, where aa=0–77.
   For P7 Relay, P7R: P7R is in the format aa, where aa=0–77.
   For Concentrator Group, CG: CG is in the format a, where a=0–7.
   For Grid, GR: G is in the format a, where a=0–7.

5. Count the number of instances (occurrences) of each unique object name and object identifier. For example, if P4R=26 appears twenty-seven times in the record of a particular machine, an instance count of 27 is associated with this object. The instance counts are stored along with each unique object and identifier.
6. The objects are sorted by object name, thus producing a compressed pulse path record. Each compressed record is a linked list containing only one list of object names, all of the object identifiers linked to each object name, and the instance counts linked to each object identifier.
7. The compressed pulse path records are stored in the Pulse Path Failure Table (PPFT).
8. The instance counts of each object identifier is compared to the failure thresholds for pulse path device failures. These thresholds are user specified for pulse devices, selectors, and controllers.
9. Those pulse path object identifiers whose instance counts exceed the applicable thresholds are marked as failed pulse path devices, selectors, or controllers.
10. To correlate pulse path device failures with network fabric failures that are "symptoms" of the pulse path failures (but are reported separately from the network order failures via fabric failure messages) with the corresponding pulse path failures and eliminate these fabric failure symptoms from false trouble notifications, the stage of switching that is associated with the particular pulse device failure is determined. This determination is made by disassembling the network order identified in the network order failure message using the appropriate (analog switching) machine-specific template.
11. The disassembly of the network order as specified above in Step 10 results in the switch path that the analog switching machine attempted to set up or tear down via that particular network order. The resulting switch path is linked to the particular pulse path record in the PPFT.
12. Mark each grid and crosspoint identified by this new switch path (in each PPFT pulse path record) as a candidate for correlation with switch path failures. These marked grids and crosspoint object identifiers therefore denote those crosspoint relays that the analog switching machine attempted to actuate, or control, via that network order. These marked objects will be searched for in the switch path failure table records during the correlation procedure.

13. The pulse path failure output report and correlation analysis output are produced below under "Outputs of Order Analysis".

Order Analysis Algorithm

The order analysis algorithm disassembles the MA NW and MI NW messages, which are sent by the switching machine whenever a network order fails in the course of setting up or tearing down a connection. When the switching machine attempts to set up a connection using a particular path, the network controller tests the path continuity as described above under "Fabric Analysis Algorithm".

If the continuity test fails, the analog switching machine outputs a fabric failure message as previously described. If the network order checking mechanism of the analog switching machine (usually a checksum-like method) determines that the network order has been translated into a pulse path other than the correct sequence of pulse devices, the analog switching machine outputs a network order failure message.

The analog switching machine's network order checking mechanism does not determine the root cause of network order failure as does the subject Analog Switch Analysis system, but rather merely informs the outside system or operator an instance of network order failure has occurred.

Message Thresholding

Whenever a candidate network order failure message is received, the message is stored in the NMA message log along with the identification of the machine that sent the message. No disassembly or analysis of network order failure messages is performed until the number of these messages from any particular analog switching machine exceeds the user-settable threshold. The default for the network order failure message threshold is eight (8) messages.

Message Disassembly

Consider the following instances of pulse path failure messages reported to Analog Switch Analysis by the machine (this example uses the AT&T 2ESS2BESS (R) message format):

Note: The 2ESS/2BESS analog switching machines utilize the same MI NW and MA NW message format to signal both fabric failures and network order failures. The Scan Point Status (SPS) field of the message indicates whether the message is being sent as a result of a network fabric failure or a network order failure.

```
MI  NW  ERR  02  01  0010  031421  007775  022210
MI  NW  ERR  02  00  0010  031421  007775  022210
MA  NW  RMV  02  00  0010  000000  007775  022210
MI  NW  ERR  02  01  0010  031421  007775  022210
MA  NW  RMV  02  00  0010  000000  007775  022210
MA  NW  RMV  02  01  0010  000000  007764  027110
MI  NW  ERR  02  01  0010  031421  007775  022210
```

These messages are disassembled to extract the pulse path objects from the machine-specific format as follows:

```
MI NW ERR   02              00                001         1         03  14              21     000775  022210
|           |               |                 |                     |                   |
Message     Network          Net-             Scan Point            Controller          Failed 28-bit
Type        Frame No.        work             Status                and network         network order
(00–14)                      controller       (Descrip-             frame of            (octal)
(Indicates                   used and         tion of               interest
failed net-                  controller       error).
work order)                  left on-line
                             by the trouble
                             recovery pro-
                             gram
```

Preferred Controller | Network Controller entry | No. of errors scored against this controller 1. Convert network order from octal to binary.
2. Concatenate the least-significant 14 bits of each field (right-Justified), to assemble the 28-bit network order.
3. Examine the Scan Point Status (SPS) field. If SPS is any value other than 3, this message indicates a network order failure (note that the case in which SPS=3 denotes a fabric failure, which was previously analyzed under "Fabric Analysis Algorithm, Message Disassembly").
4. If SPS is not equal to 3, proceed with Population of the Pulse Path List as described below.

Population of the Pulse Path List (PPL)

The PPL holds a number of records, 1 through N, each record containing the information obtained by disassembling the message. Each record of the PPL is generated as follows:

1. Store the switching office alias and switching matching location identification at the beginning of the record.
2. Store the network and frame numbers.
3. Extract and concatenate the specified bite of the 28-bit network order thus forming separate data items. The disassembled network order describes the failed pulse path reported in the message. Convert the binary values of each data item to octal digits and store the converted data items, with a unique object name for each data item (object), in the PPL record in the following order:

| | | |
|---|---|---|
| 1. | Bits 5–2: | Order (0–15) |
| 2. | Bits 12, 11, 6, 7: | P1 Relay (0–15) |
| 3. | Bits 13, 10–8: | P2 Relay (0–15) |
| 4. | Bits 26, 19–17: | P3 Relay (9–15) |
| 5. | Bits 19–17: | G-subfield of P4 Relay ID (In format GX) (0–7) |
| | Bits 13–11: | X-subfield of P4 Relay ID (In |

-continued

| | | |
|---|---|---|
| | | format GX) (0-7) |
| 6. | Bits 19-17: | G-subfield of P5 Relay ID (In format GX) (0-7) |
| | Bits 26, 25-24: | X-subfield of P5 Relay ID (In format GX) (0-7) |
| 7. | Bits 19-17: | G-subfield of P6 Relay ID (In format GX) (0-7) |
| | Bits 22-20: | X-subfield of P6 Relay ID (In format GX) (0-7) |
| 8. | Bits 19-17: | G-subfield of P7 Relay ID (In format GX) (0-7) |
| | Bits 25-23: | X-subfield of P7 Relay ID (In format GX) (0-7) |
| 9. | Bits 16-14: | Concentrator Group (0-7) |
| 10. | Bits 19-17: | Grid |

4. Append the disassembled switch path (as determined by disassembling the network order as described above under "Fabric Analysis") to the PPL record for this message.

5. Repeat the above procedure, beginning with Step 1, until all of the network order failure messages have been processed. The PPL should contain one record corresponding to each message.

Pulse Path Failure Patterning

The information contained within the PPL is used to construct patterns of pulse path device failures so that the individual pulse path device failures can be localized as root causes, and also to exclude the symptoms fabric failure instances from falsely being reported as root-cause failures.

The PPL contains lists defining pulse paths (that is, the series of pulse devices that were ordered to actuate the crosspoint relays assigned to this particular connection setup or teardown) whose actuating network orders failed. The pulse path patterning component of Order Analysis identifies common pulse device failure points and correlates these pulse device failures with the corresponding switch path failures that resulted from the pulse device failures as follows:

1. Sort the records in the PPL by switching machine identification. Each record containing messages from the same machine should be placed sequentially in the same block.
2. Within each block of the PPL (each block corresponding to one machine) count the number of appearances of each object in the PPL. For example, with an object name of P4R, increment the instance count for object name P and object ID 4R.
3. Construct a new list, the Pulse Path Failure Table (PPFT). Each record of the PPFT consists of Machine ID, office alias, object name, object ID, and appearance count for each object ID.
4. Combine all objects of the same name (within each PPFT record) by merging all of the object identifiers associated with like object names. The merged records should then contain only one occurrence of each object name and all of the object IDs, appearance (instance) counts, and corresponding switch paths associated with each object name.
5. Compare the number of instances of each unique pulse device (identified by each unique object name) with the user-specified thresholds for pulse device, selector, or network controller failures. Flag those object identifiers having appearance (i.e. failure) counts that have matched or exceeded the thresholds. Store the flag with each object ID in the PPFT.

As an example, consider the following PPFT. Each pulse path object and object identifier is scored against the applicable user-specified threshold for pulse device failures. Assume in this case that the threshold is 3, therefore, any instance count for a unique pulse path object identifier (i.e., the same pulse path device, selector, or network controller) greater than or equal to 3 will indicate a failure of that particular pulse path device.

| Pulse Path Object | Object Identifier | Instance Count | Failed |
|---|---|---|---|
| Network Frame | 02 | 7 | Yes |
| Network Controller Used | 0 | 6 | Yes |
| | 1 | 1 | No |
| Order | 17 | 6 | Yes |
| | 15 | 1 | No |
| P1 Relay | 07 | 7 | Yes |
| P2 Relay | 07 | 7 | Yes |
| P3 Relay | 01 | 7 | Yes |
| P4 Relay | 11 | 7 | Yes |
| P5 Relay | 10 | 7 | Yes |
| P6 Relay | 21 | 6 | Yes |
| | 11 | 1 | No |
| P7 Relay | 21 | 6 | Yes |
| | 71 | 1 | No |
| Concentrator Group | 0 | 7 | Yes |
| Grid | 1 | 7 | Yes |

Outputs of Order Analysis

The failed pulse path objects are used to produce an output report which contains a list of the failed objects. This list of failed pulse path objects identifies the common failure points in the pulse path devices. Using this list, and a translation table (specific to the machine type and configuration, which translates the failed pulse device identification to the physical location of the device within the analog switching machine), a technician can physically identify the failed device within the network frame for repair or replacement.

The pulse path failures may result in uncorrelated fabric failure information to be generated. These fabric failure messages will not result in a correlated failure to be patterned from the Fabric Analysis processes previously described. The patterned pulse path device failure will then eliminate the corresponding fabric failure messages as the cause of the underlying problem. The last step in Analog Switch Analysis patterning is therefore to search the fabric failure message records for any messages identifying the same switch path that has patterned pulse path failures.

This correlation process is performed by searching the previously stored Switch Path Failure Tables (SPFTs) for instances of the identical stages of switching as those that were extracted from the order analysis messages by disassembling the order analysis messages' network orders. If this search yields a positive result, that is, a disassembled switch path from the Pulse Path Failure Table (PPFT) contains switch path objects that match those in the SPFT, the patterned pulse path failure (the PPFT entry) is, in turn, output as the root cause failure.

The SPFT entries that were identified in this search are marked to eliminate them from further fabric analysis. As a result of this correlation process, the Analog Switch Analysis System has eliminated apparent fabric failures and outputs the pulse device failure as the root cause problem. In previous manual methods of analysis, such as the currently used methods related to the No. 2 SCCS (R) system, much laborious checking and rechecking of SCCS outputs is required to determine the root-cause failure, and the results of this laborious manual process are not always conclusive.

SUMMARY

By providing a fault patterning and isolation mechanism, by which the root-cause fabric and/or pulse path troubles are found, a great deal of effort and expense is saved over current manual methods of fault isolation. Since fabric and pulse device troubles often result in other equipment and components of the switch as appearing failed, the ability to locate the root-cause trouble is an extremely valuable feature of the invention.

While some existing systems report individual switch messages and draw raw (unpatterned) switch pictures for every instance of failure, the present invention provides improvement through the patterning and correlation of error messages to isolate root-cause failures. Further, the present invention correlates between fabric and pulse-path troubles to eliminate inconclusive or ambiguous trouble indications between the different classes of faults.

The foregoing description of the preferred embodiment has been presented to illustrate the invention. It is not intended to be exhaustive or to limit the invention to the form disclosed.

In applying the invention, modifications and variations can be made by those skilled in the pertaining art without departing from the scope and spirit of the invention. It is intended that the scope of the invention be defined by the claims appended hereto, and their equivalents.

What is claimed is:

1. A system for operating an analog telephone switching machine having a first plurality of paired line link and trunk link networks, each of the paired networks having a second plurality of sequentially interlinked switch stages, each of the switch stages having multiple grids with input levels and output levels interconnectable at crosspoints by respective relay switches and interconnectable between switch stages by links to form call connection paths, and pulse order objects being provided in a third plurality of pulse paths for energizing the crosspoint relays, the system comprising:

a controller for generating network call connection orders and operating the pulse devices to implement the network orders;

said controller generating a post-connection continuity check and generating an error message if the continuity check indicates that the ordered connection has failed;

means for processing the error messages generated over time to identify the root cause of connection failures;

said processing means having means for identifying failed crosspoints from error messages that represent failed crosspoints; and said processing means having means for identifying failed pulse path objects from error messages that represent failed pulse paths.

2. The system of claim 1 wherein means are provided for removing from operation crosspoints identified as having failed.

3. The system of claim 1 wherein means are provided for removing from operation crosspoints correlated with failed pulse objects.

4. The system of claim 2 wherein means are provided for removing from operation crosspoints correlated with failed pulse objects.

5. A system for operating an analog telephone switching machine having a first plurality of paired line link and trunk link networks, each of the paired networks having a second plurality of sequentially interlinked switch stages, each of the switch stages having multiple grids with input levels and output levels interconnectable at crosspoints by respective relay switches and interconnectable between switch stages by links to form call connection paths, and pulse order objects being provided in a third plurality of pulse paths for energizing the crosspoint relays, the system comprising:

a controller for generating network call connection orders and operating the pulse devices to implement the network orders;

said controller generating a post-connection continuity check and generating an error message if the continuity check indicates that the ordered connection has failed;

means for processing the error messages generated over time to identify the root cause of connection failures;

said processing means having means for identifying failed crosspoints from error messages that represent failed crosspoints; and means for removing from operation crosspoints identified as having failed.

6. The system of claim 1 wherein the failed crosspoints identifying means includes means for detecting stuck closed crosspoints.

7. The system of claim 2 wherein the failed crosspoints identifying means includes means for detecting stuck closed crosspoints.

8. The system of claim 4 wherein the failed crosspoints identifying means includes means for detecting stuck closed crosspoints.

9. The system of claim 1 wherein the failed crosspoints identifying means includes means for detecting stuck open crosspoints.

10. The system of claim 2 wherein the failed crosspoints identifying means includes means for detecting stuck open crosspoints.

11. The system of claim 4 wherein the failed crosspoints identifying means includes means for detecting stuck open crosspoints.

12. The system of claim 1 wherein the failed crosspoints identifying means includes means for detecting link failures.

13. The system of claim 2 wherein the failed crosspoints identifying means includes means for detecting link failures.

14. The system of claim 4 wherein the failed crosspoints identifying means includes means for detecting link failures.

15. The system of claim 1 wherein the failed pulse path object identifying means includes means for detecting failed pulse devices.

16. The system of claim 3 wherein the failed pulse path object identifying means includes means for detecting failed pulse devices.

17. The system of claim 4 wherein the failed pulse path object identifying means includes means for detecting failed pulse devices.

18. The system of claim 1 wherein the failed pulse path object identifying means includes means for detecting failed bus units.

19. The system of claim 3 wherein the failed pulse path object identifying means includes means for detecting failed bus units.

20. The system of claim 4 wherein the failed pulse path object identifying means includes means for detecting failed bus units.

21. The system of claim 1 wherein the failed pulse path object identifying means includes means for detecting a failed network controller.

22. The system of claim 3 wherein the failed pulse path object identifying means includes:
   means for detecting a failed network controller; and
   means for removing a failed network controller and initiating operation of a backup network controller upon removal of the failed network controller.

23. A method for operating an analog switching machine having a first plurality of paired line link and trunk link networks, each of the paired networks having a second plurality of sequentially interlinked switch stages, each of the switch stages having multiple grids with input levels and output levels interconnectable at crosspoints by respective relay switches and interconnectable between switch stages by links to form call connection paths, and pulse order objects being provided in a fourth plurality of pulse paths for energizing the crosspoint relays, the method steps comprising:
   generating network call connection orders and operating the pulse devices to implement the network orders;
   generating a post-connection continuity check and generating an error message if the continuity check indicates that the ordered connection has failed;
   processing the error messages generated over time to identify the root cause of connection failures;
   identifying failed crosspoints from error messages that represent failed crosspoints; and
   identifying failed pulse path objects from error messages that represent failed pulse paths.

24. The method of claim 23 wherein the method steps further include removing from operation crosspoints identified as having failed.

25. The method of claim 23 wherein the method steps further include removing from operation crosspoints correlated with failed pulse objects.

26. The method of claim 24 wherein the method steps further include removing from operation crosspoints correlated with failed pulse objects.

27. The method of claim 23 wherein:
   the failed crosspoint identifying step includes:
   a first substep of detecting stuck closed crosspoints;
   a second substep of detecting stuck open crosspoints; and
   a third substep of detecting link failures.

28. The method of claim 24 wherein the failed pulse path object identifying step includes:
   a first substep of detecting failed pulse devices;
   a second substep of detecting failed bus units;
   a third substep of detecting a failed network controller; and wherein the method further includes the step of:
   removing a failed network controller and initiating operation of a backup network controller upon removal of the failed network controller.

29. The system of claim 1 wherein the processing means employs a pattern recognition technique in identifying failures.

30. The method of claim 23 wherein the identifying steps use pattern recognition procedures.

31. The system of claim 29 wherein the pattern recognition technique records crosspoint commonalities in recorded failed connections, and the processing means further includes means for identifying root causes of connection failures from at least the crosspoint commonalities.

32. The method of claim 30 wherein the pattern recognition procedures include recording crosspoint commonalities in recorded failed connections, and the identifying steps further include identifying root causes of connection failures from at least the crosspoint commonalities.

* * * * *